United States Patent [19]

Bultman et al.

[11] Patent Number: 4,870,643
[45] Date of Patent: Sep. 26, 1989

[54] PARALLEL DRIVE ARRAY STORAGE SYSTEM

[75] Inventors: David L. Bultman, Simi Valley; Anthony Fung, Granada Hills, both of Calif.

[73] Assignee: Micropolis Corporation, Chatsworth, Calif.

[21] Appl. No.: 118,785

[22] Filed: Nov. 6, 1987

[51] Int. Cl.⁴ .............................................. G06F 11/12
[52] U.S. Cl. ................................. 371/11.1; 371/40.2; 360/98.01
[58] Field of Search ....................... 371/10, 11, 29, 38, 371/39, 40, 37, 49, 50, 51; 364/200, 900

[56] References Cited

U.S. PATENT DOCUMENTS

| | | | |
|---|---|---|---|
| 4,598,357 | 7/1986 | Swanson | 371/10 |
| 4,608,688 | 8/1986 | Hansen | 371/10 |
| 4,722,085 | 1/1988 | Flora | 371/38 |
| 4,733,396 | 3/1988 | Baldwin | 371/38 |
| 4,761,785 | 8/1988 | Clark | 371/38 |

FOREIGN PATENT DOCUMENTS 854004934 10/1985 European Pat. Off. .

*Primary Examiner*—Michael R. Fleming
*Attorney, Agent, or Firm*—Poms, Smith, Lande & Rose

[57] ABSTRACT

A large capacity digital storage system includes five standard 5¼ inch Winchester disk drives, a formatter for each disk drive, and a master controller for coupling to the host computer or data processor. The spindles of the disk drives are rotated in synchronism to improve data handling. Successive bytes of digital information are routed to four of the drives, and the fifth drive has parity check information; and control circuitry is provided so that any one of the five standard drives may be unplugged and replaced without interruption of storage system operation.

32 Claims, 22 Drawing Sheets

TIMING CONTROL

FIG. 8B
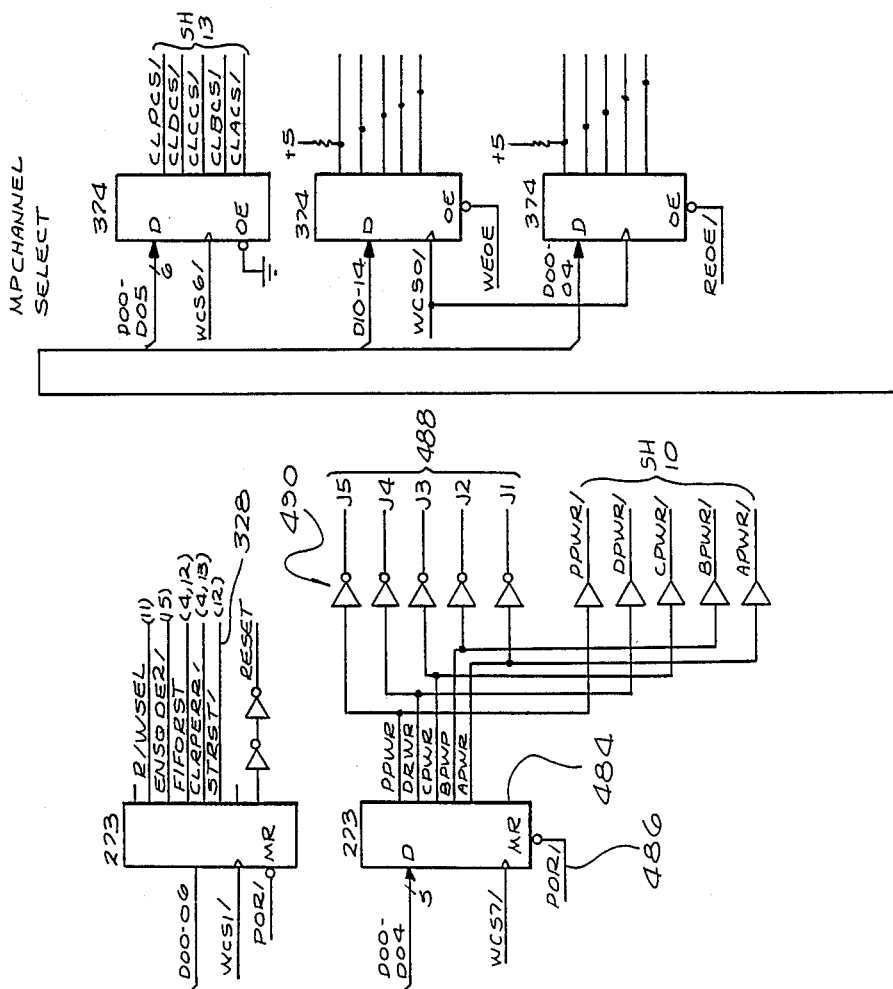
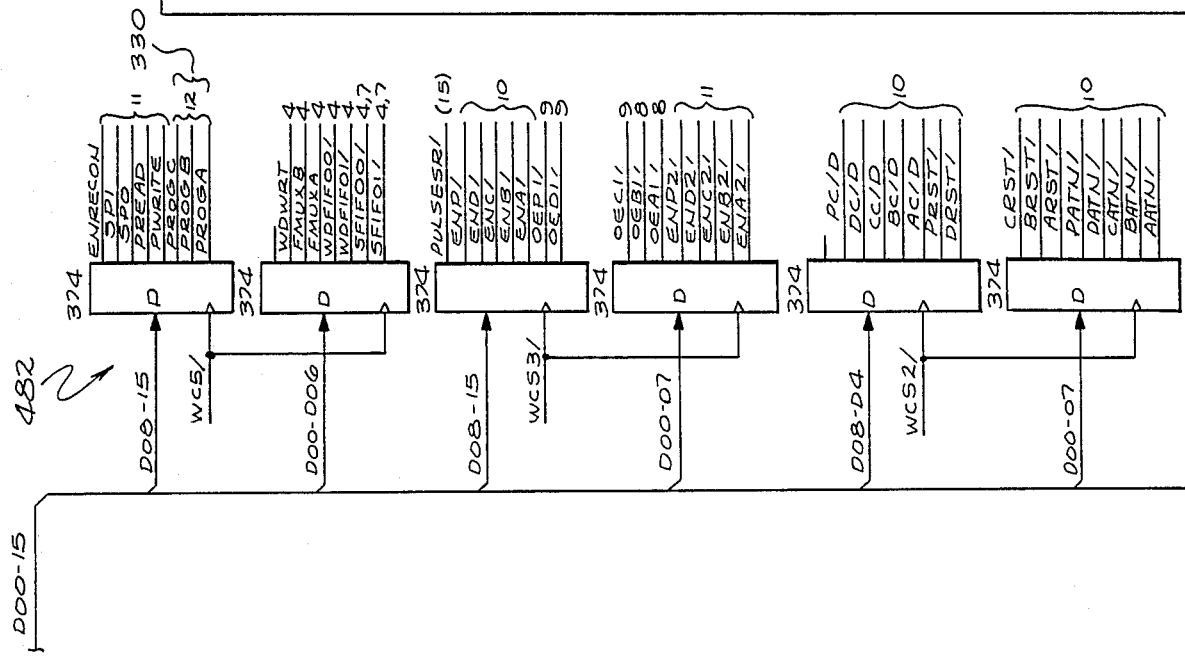

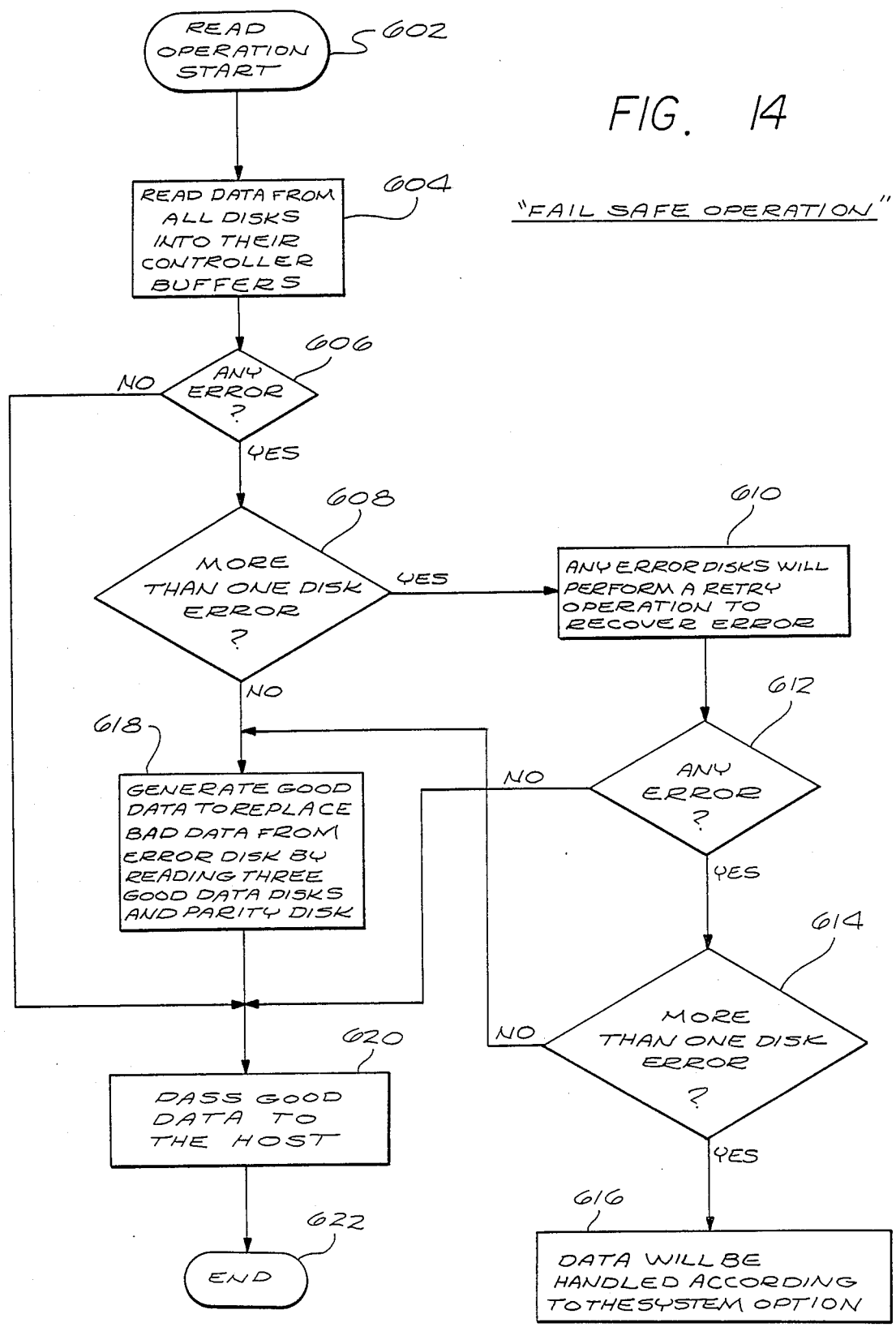

PARALLEL DRIVE ARRAY STORAGE SYSTEM

FIELD OF THE INVENTION

This invention relates to digital storage systems using a plurality of Winchester disk drives.

BACKGROUND OF THE INVENTION

In the field of digital data storage systems, five and one-quarter inch Winchester disk drives are widely used; and their dimensions have been standardized at 3.25 inches by 5.75 inches by 8.0 inches. The storage capacity of these units has been increasing, with the 1500 series units made by Micropolis, the assignee of the present invention, now having a storage capacity above 350 megabytes; and it is expected that this capacity will at least double in the relatively near future. Incidentally, a "byte" of digital information includes eight binary digits or "bits" of information, a megabyte is a million bytes or 8,000,000 bits, and one gigabyte is a billion bytes or eight billion (8,000,000,000) bits of digital information.

With the relatively high production quantities of five and one-quarter inch Winchester disk drives, the cost per megabyte has come down to a moderate level. However, for higher storage capacities, coupled with higher data rates, typically accomplished by 10½ and 14 inch parallel head Winchester drives, the cost per megabyte has been substantially higher, in the order of at least two or three times the cost per megabyte of the individual five and one-fourth inch drives.

Accordingly, a principal object of the present invention is to provide a large scale, high data rate storage system having a substantially lower cost per megabyte than the systems which are currently available.

Incidentally, proposals have been made heretofore to use two or more Winchester type drives together, to provide higher reliability or a larger storage capacity. For example, reference is made to U.S. Patent Defensive Publication No. T932,005 dated Mar. 4, 1975, U.S. Pat. No. 3,623,014, granted Nov. 23, 1971 and to European Patent Application Nos. 85 4004 93.4 published Oct. 2, 1985, 156,724. The first two references cited above essentially use a second Winchester drive to duplicate the stored information, to provide increased reliability. Concerning the European Patent Publication, it appears to include a superficial disclosure of a system in which it is proposed that several Winchester drive storage units be employed, and in which successive bits of incoming data are to be routed to the different storage units. It is also noted that the various Winchester drive units are not synchronized, thereby adding additional delays to data access times.

As compared with the foregoing prior art arrangements, principal objects of the present invention are to reduce the data access time, and to provide a reliable, high capacity, high data rate, and relatively inexpensive storage system.

SUMMARY OF THE INVENTION

In accordance with one aspect of the invention, at least three standard commercially available disk drives are operated together, to appear as one singular unit using a data formatter for each drive and a master controller, and with successive bytes (or groups of bits) of information being routed to all except one of the successive disk drives, and with one drive serving as a parity check storage unit.

An important feature of the invention is the parallel transfer of data to the multiple drives, thereby increasing the data rate of the system.

In accordance with another aspect of the invention, all of the disk drives are operated in synchronism, with spindle synchronization circuitry from the master controller providing synchronization signals to each drive, so that all of the disks rotate substantially together, and failure of any one drive not affecting synchronization of the other drives.

In accordance with a further aspect of the invention, all of the disk drives may be physically mounted in a housing, side-by-side on tracks, with a drive formatter associated with each drive, and the combination being slidable in and out of mating connectors in the housing, so that the individual drives and associated drive formatters may be easily replaced and a new unit put into operation by pulling one of the units out and sliding the new unit into its place.

Further, control and signal actuation circuitry is provided to indicate fault conditions, and to permit continued operation of the system even with one drive unit completely disabled, through the use of parity information from the parity check drive. Circuitry is also provided for permitting the removal of a failed drive and the substitution of a new drive without interruption of operation of the system.

Another feature of the invention permits full regeneration of data when a new drive is substituted for a failed drive, either with the system remaining "on-line", or with the system dedicated to data regeneration.

A further aspect of the invention involves the coupling of the host computer to the master controller of the storage system of the invention, using a standard SCSI bus and data system, wherein delay in coupling the host computer is minimized by initial processing of partial SCSI commands, relating to data transfer, and relaying head positioning information to the drives, instead of delaying all action until the full SCSI command is processed.

The signal lights, alpha-numeric display and control keyboard constitute another feature of the invention. In one illustrative embodiment of the invention, the complete storage system has a front cover, and the signal lights, which may be light-emitting diodes (LEDs), are visible through the front cover. If the system is working properly with no faults, the signal light display will so indicate. However, if a fault should occur, the front bezel or cover of the system may be removed, to expose the control panel. To conserve space, the control panel, the signal lights, and the associated printed circuit board may be pivotally mounted to swing out of the way to permit the replacement of drives. Alternatively, the control panel may be on the front cover of the unit, or in an alternative location where it will not interfere with the replacement of drives.

The control panel may include a digital keyboard for providing test instructions to the system when it is in the fault diagnostic mode.

An LED display may also be provided on the control panel to visually indicate the nature of faults, the results of diagnostic tests, and similar information.

Advantages of the system of the present invention include:

1. High reliability, with a mean time to failure for the entire system being estimated at 65,000 hours. For the drive matrix, excluding the power supply and the master controller, the mean time before failure (MTBF) is estimated at 1,400,000 hours.

2. Rapid throughput of information resulting from spindle synchronization of the drives.

3. Low cost per megabyte of storage, resulting from the use of standard mass produced 5¼ inch drives.

4. Rapid response to host computer instructions resulting in part from early response to initial data transfer information included in SCSI format instruction.

5. Capability of replacing a failed or malfunctioning drive and regenerating data while the system is on-line, without interrupting operation.

6. The system has a relatively high data rate, of 5 megabytes per second when a five drive system configuration is employed, and 10 megabytes per second when a ten drive system configuration is used.

7. The system provides natural encryption or encoding, with no extra cost or penalty, as the information on each drive is only a fraction of the complete data, and is unintelligible per se.

Other objects, features, and advantages will become apparent from a consideration of the following detailed description, and from the accompanying drawings.

BRIEF DESCRIPTION OF THE DRAWINGS

FIGS. 8A and 8B together form a block diagram for another major portion of the master controller, involving the master, controller CPU and associated input and output circuitry;

FIG. 14 is a diagram representing the "fail-safe" mode of operation of the system.

DETAILED DESCRIPTION

Figures 1, 12:
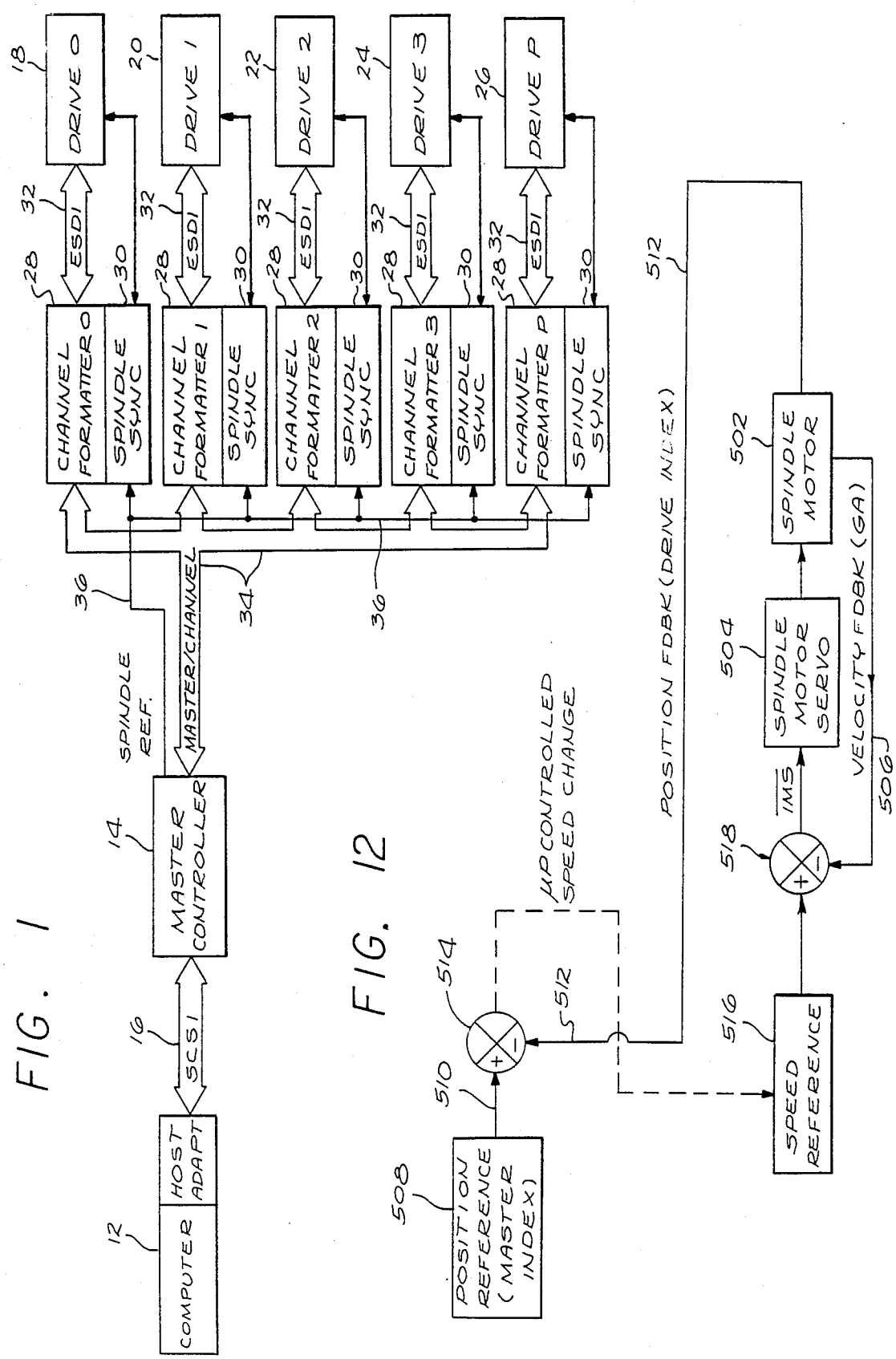
FIG. 1 is a block diagram of a system illustrating the principles of the present invention.
FIG. 12 is a servo loop functional diagram indicating the mode of operation of the spindle synchronization circuitry.

Referring more particularly to the drawings, a host computer 12 is coupled to the master controller 14 forming part of the system of the present invention, by a SCSI interface 16. Incidentally, the letters "SCSI" stand for Small Computer System Interface, and this is a well known industry standard. At the far right-hand side of FIG. 1 are a series of standard commercially available Winchester drives 18, 20, 22, 24 and 26. These drives may, for example, be 5¼ inch disk drives of the 1500 Series, manufactured by the assignee of the present invention, Micropolis Corporation, 21329 Nordhoff Street, Chatsworth, Calif. 91311. Associated with each of the five drives is a channel formatter 28 and associated spindle synchronization circuitry 30. Interconnecting the channel formatters and the drives is a series of ESDI interface circuits 32. Coupling the master controller 14 to the individual channel formatters 28 is a master/channel bus 34, and a spindle reference signal circuit 36.

With regard to the spindle synchronization circuitry, it may be noted that each of the drives 18, 20, 22, 24 and 26 are all separately synchronized to a spindle reference signal supplied to the circuits 30 on lead 36 from the master controller 14, and none of the drives is separately coupled or synchronized with the other. As a result of the fact that the drives are all independently synchronized to the master synchronization pulses arriving on the lead 36, the failure of any one drive does not affect the synchronization of the other drives. Incidentally, this type of arrangement is to be preferred over arrangements wherein one of the drives is employed as a master to which the other drives are slaved, so that the entire system does not go down in the event that the master drive should fail.

It is also noted that, in handling data received from the host computer 12, the master controller splits up the data into successive bytes, each including eight bits of information, and routes the successive bytes of information through the channel formatters 28, with the first byte being applied to drive 18, the second byte being applied to drive 20, the third byte of digital information being applied to drive 22, and the fourth byte of information being applied to drive 24. A parity check byte of eight bits is also formed, and this is applied to drive 26, which is the parity check drive. The fifth byte of information is routed to drive 18, and the sequence is continued in this manner. The data is supplied between the individual channel formatters and the master controller in parallel, and this permits a high data rate for the storage system.

Attention will now be directed to FIGS. 2A, 2B and FIGS. 3 and 4, which show certain physical aspects of the present system. With regard to dimensions, the standard 19 inch electrical equipment rack size actually has approximately 17.81 inches available between the supporting frame members. Further, the modular vertical size involves increments of 1¾ inches. In the present case, with standard drives being 5¾ inches in width in their normal horizontal orientation, by orienting the drives with each of five drives being on what would normally be their sides, the total vertical extent of the housing may be 7 inches, or four times the modular distance of 1¾ inches. In addition, five drives, each having a thickness of 3.25 inches, may be fitted within the 17.81 inch distance available with standard 19 inch racks.

Figure 2:
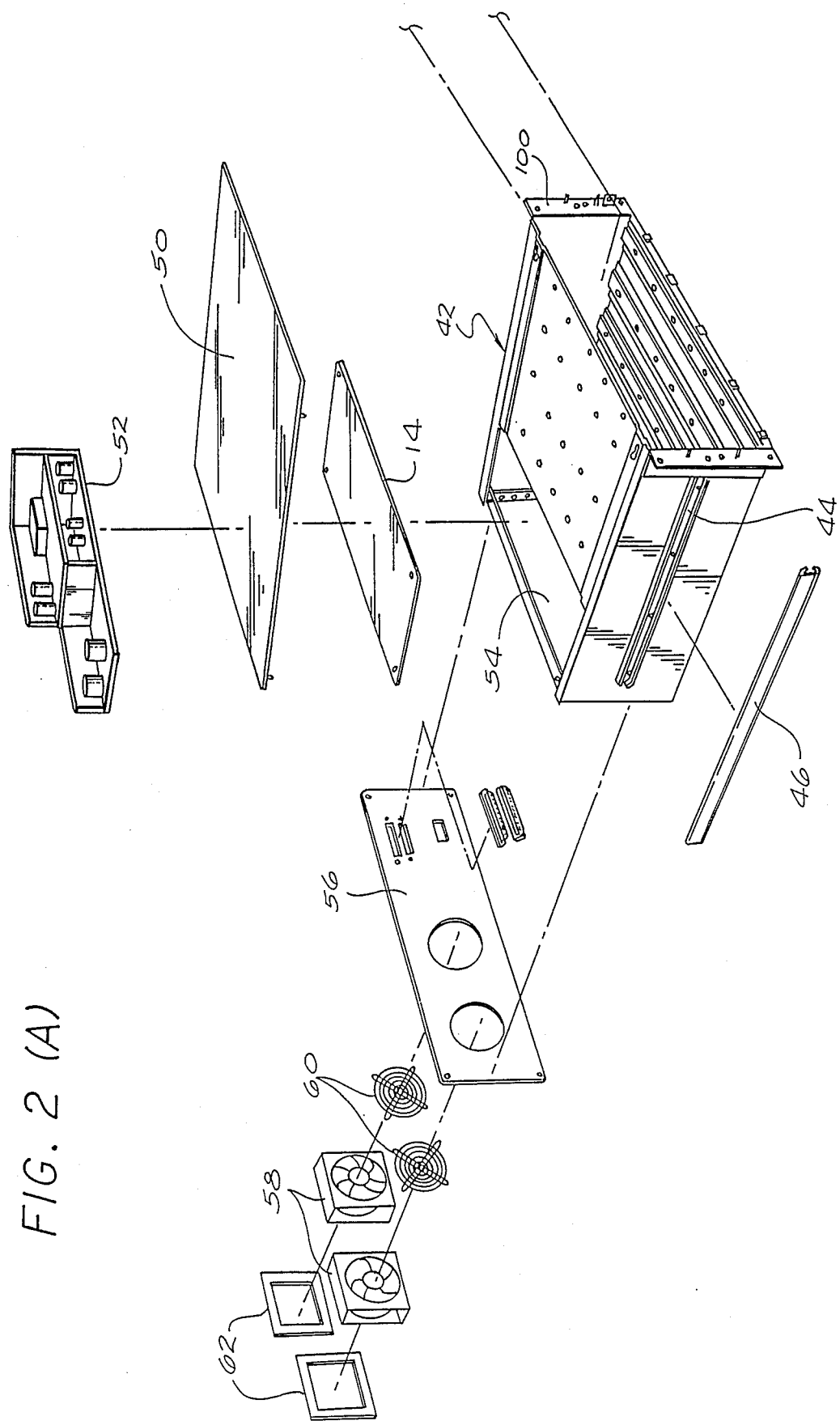
FIGS. 2A, and 2B together form an exploded view showing one illustrative physical configuration of the system of FIG. 1.
Figure 2B:
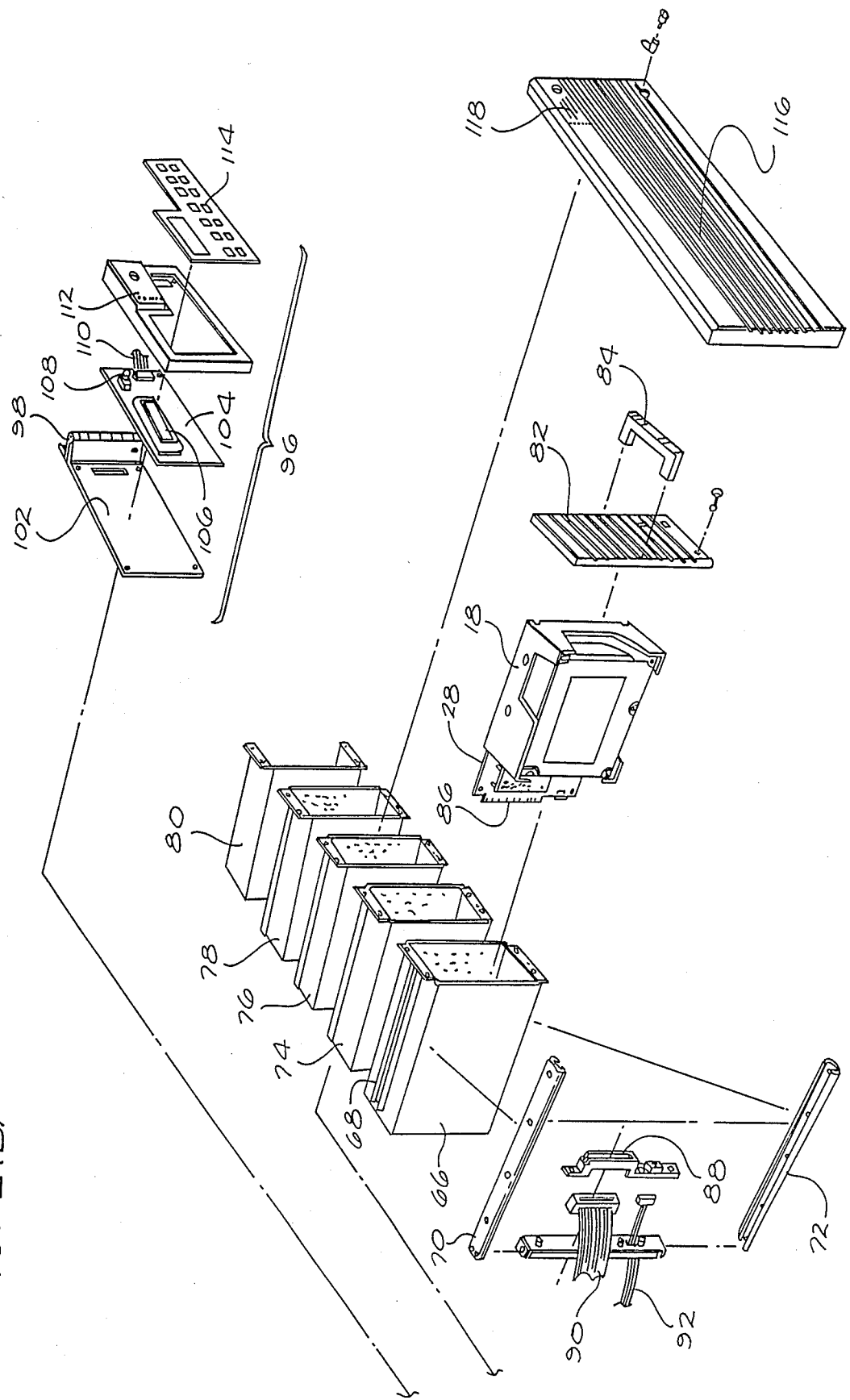

Now, referring to FIGS. 2A and 2B and of the drawings, an exploded view of the physical configuration of the system is presented. More specifically, the system includes a main housing 42 provided with side rails 44 which interfit with the mounting rails 46 which would be secured to the 19 inch rack. The transverse dimension of the housing 42 without the tracks is approximately 17¼ inches, so that, with the tracks 44 and 46 on either side, the housing 42 may be mounted in the 17.81 inches available between the frame members of a 19-inch rack.

Turning to the other parts which appear in FIG. 2A, the master controller circuit board is shown schematically by the board bearing reference numeral 14, and the top cover of the unit is shown at reference numeral 50. The power supply unit 52 is mounted within the space 54 to the rear of the housing 42. The rear closure 56 of the housing 42 is provided with fans 58 and associated grilles 60 and supporting frame members 62.

Referring to FIG. 2B, one of the five drive units 18, together with its associated channel formatter 28 embodied in circuit boards secured to the rear of the drive 18, is shown. The drive and its associated formatter 28 are mounted within the subassembly 66 which is provided with upper and lower tracks, with the upper track 68 being visible in FIG. 2B. Mating upper and lower tracks 70 and 72 are secured within the housing 42 so that all five of the subassemblies 66, 74, 76, 78 and 80 may be mounted side-by-side toward the front of the housing 42, all as shown to better advantage in FIG. 4 of the drawings. At the front of each of the subassemblies, such as the subassembly 68, a front cover plate 82 is provided, along with a handle 84 which may be employed in pulling the individual subassemblies out, and replacing them, as indicated schematically in FIG. 4 of the drawings.

Extending outwardly from the rear of each of the subassemblies 66, 74, etc., is a printed circuit board having a rear edge which forms a male connector 86. As each subassembly, such as the subassembly 66 is slid into the housing 42, guided by tracks such as those indicated by reference numerals 68, 70 and 72, the male connector 86 mates with a floating female connector 88 which is mounted within the housing 42 for automatic self-alignment as the male connector 86 moves to the rear within housing 42. Cables 90 and 92 couple the drive 18 and the channel formatter 28 to the master controller 14 and to the power supply 52.

A signal light, control panel, and visual display assembly, indicated by the reference numeral 96 is mounted by the hinge 98 to the flange 100 which appears at the front right-hand side of the housing 42, as shown in FIG. 2A. The assembly 96 includes a support plate 102, a printed circuit board 104 which carries a liquid crystal display 106, having the capability of displaying two rows of alphanumeric characters of 16 characters each. In addition, the assembly 96 includes the write protect switch 108 and the cable 110 which couples the circuitry to the master controller. A series of light-emitting diodes 112 are also provided for signaling purposes, and the switch panel 114 permits manual control of the system, and the entering of control signals for diagnostic and other functions, in the event of faults occurring in the system. Incidentally, an enlarged view of the control panel is set forth in FIG. 3 of the drawings.

The front cover 116 of the system is shown to the lower right in FIG. 2B, and this cover has a series of openings 118 through which the light-emitting diodes are clearly visible, so that the status of the system may be readily determined. If the system is "on line" and operating properly, there is no need to remove the cover 116. However, if the LED displays visible through the openings 118 indicate fault conditions, as indicated by the legends adjacent the openings, the cover 116 is removed, and appropriate diagnostic steps may be taken.

Figure 4:
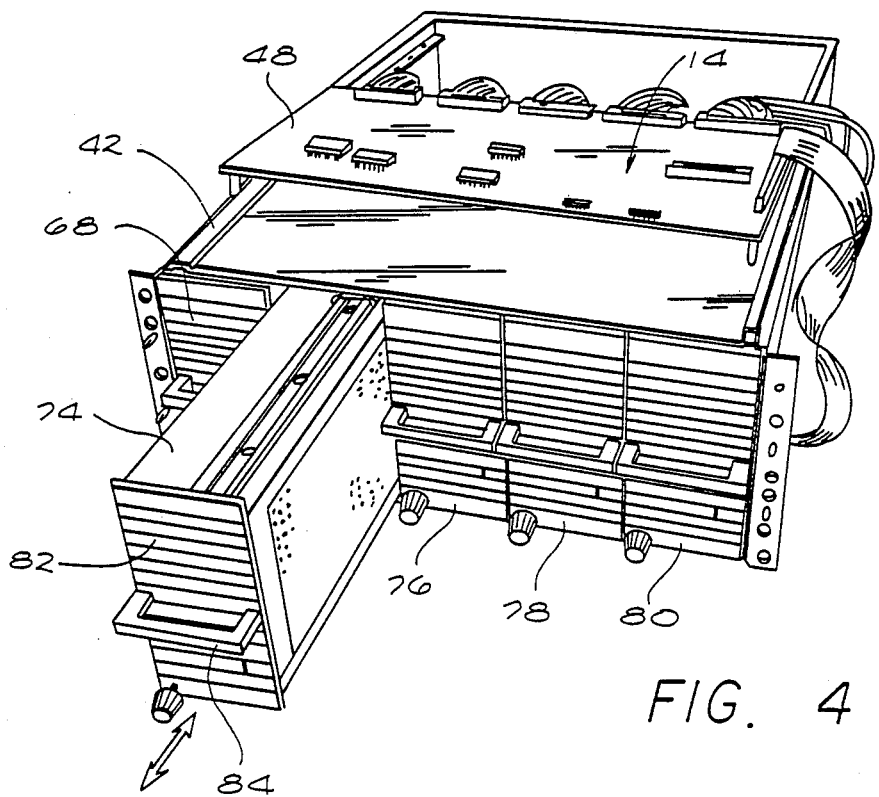
FIG. 4 is a showing of the computer of FIGS. 1 and 2, with the front panel and the control panel removed, and one of the five Winchester drive and formatter units pulled part-way out of the system for replacement.

As will be developed in greater detail hereinbelow, the present system is unique in the capability of being able to have one of the drive and channel formatter subsystems removed, while the overall storage system is still on-line and performing its normal function. FIG. 4 indicates schematically how one drive and formatter unit could be easily removed by grasping the handle 84 and pulling the unit out and merely substituting a new subsystem including a drive and formatter in its place. With the self-aligning male and female edge connectors of the type discussed hereinabove relative to reference numerals 86 and 88, (see FIG. 2B), once the new unit has been slid into position to replace the failed or malfunctioning subsystem, the electrical connections to the channel formatter and drive are automatically closed so that it may be immediately powered up. Further, as discussed hereinbelow, the data previously applied to the failed drive may be reconstituted in a relatively brief period of time, using the information on the other three data drives, and that from the parity drive.

Figure 3:
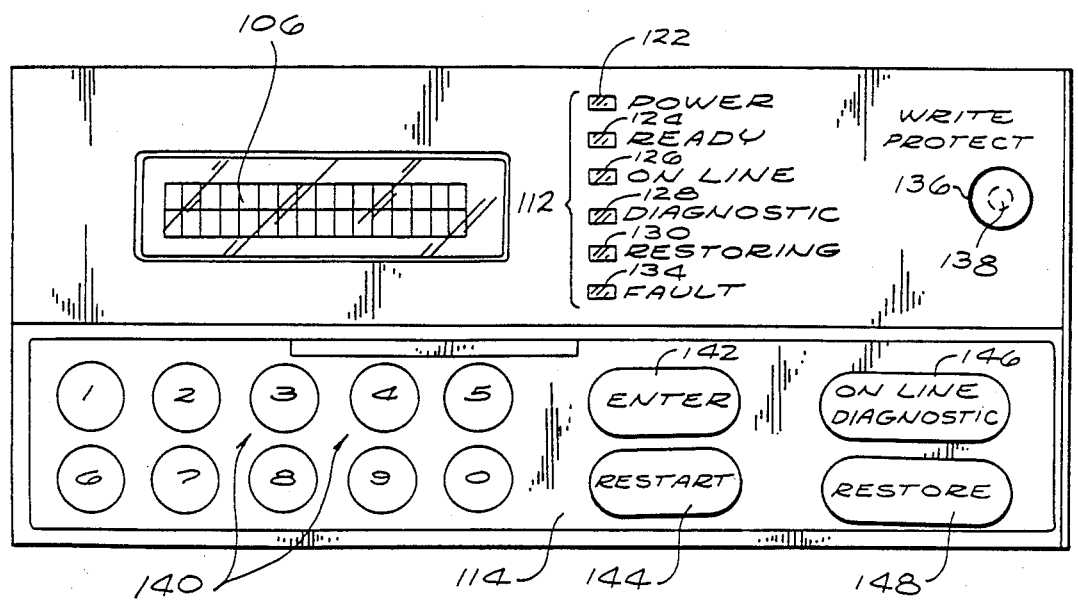
FIG. 3 is an enlarged view of the control and signaling panel included in the system of FIGS. 1 and 2.

The overall mode of operation of the control panel, including the display, the signal lights, and the various switches will now be considered in connection with FIG. 3 of the drawings, and thereafter, the implementing electrical circuitry and program functions will be considered in some detail in connection with the additional figures of the drawings.

Referring now in detail to FIG. 3, the individual light-emitting diode signal lights included at 112 are the LED 122, designated "POWER"; the LED 124 designated "READY"; the LED 126, designated "ON-LINE"; the LED 128, designated "DIAGNOSTIC"; the LED 130, designated "RESTORING"; and LED 134, designated "FAULT". In addition, the front panel includes the write protect switch 136 which includes an internal LED 138 to indicate when the write protection function is in effect, precluding the writing of information onto any of the disk drives, when the "WRITE PROTECT" switch is pushed in. The key pad portion 114 of the panel includes the numerical key pad section 140, and four additional switches, with the "ENTER" switch being designated by the reference numeral 142, the "RESTART" switch being designated by reference numeral 144, the "ON-LINE DIAGNOSTIC" switch being designated by the reference numeral 146, and the final "RESTORE" switch being identified by reference numeral 148.

Now, assuming that the system is on-line and operating, the top three signal lights 122, 124, and 6 will be energized and lit, and the liquid crystal display 106 will display the message "SYSTEM RUNNING". While the system is on-line, the master controller will scan the state of the front panel switch status registers for inputs. The "WRITE PROTECT" switch 136, the "ON-LINE DIAGNOSTIC" switch 146 and the "RESTORE" switch 148 are the only inputs to which the master controller will respond while it is in the "ON-LINE" state. The number keys 140, the "RESTART" switch 144, and the "ENTER" switch 142 will all be ignored.

The Write Protect switch 136 is a "PUSH-ON-PUSH-OFF" two position switch. When the switch is pushed in, the LED 138 will be lit and writing to the drives will be inhibited. When the switch is out, the LED 138 will be off, and data may be written to the drives.

The "On-Line/Diagnostic" switch 146 controls the mode of operation of the system. Pressing this switch 146 while the system is on line, will change the system to the diagnostic mode, and no further commands will be recognized or accepted on the SCSI bus 16 coupling the master controller to the host computer. The "On-Line" LED 126 will be turned off and the "Diagnostic" LED 128 will be lit.

Pressing the "Restore" switch 148 will begin a restore operation on a channel that was powered down by the system to a fault. This function can be performed if one and only one channel drive has failed, and is normally accomplished after a module including a new drive and associated formatter have been substituted for a failed drive. The "Restoring" LED 130 will be lit until the data previously stored or intended to be stored in a failed drive has been completely restored. This function may be carried on during normal operation, in time intervals when the host computer is not accessing the storage system; or alternatively, the system may be fully shifted over to the restoring mode, and the system taken off line, in which case the full restoring of a substituted drive might take in the order of 15 minutes to a half hour.

When it is desired to restore data onto a newly substituted drive unit rapidly, on a dedicated basis, the "ON-LINE DIAGNOSTIC" switch 146 is actuated, and then the "RESTORE" switch 148 is actuated. However, if the "RESTORE" switch 148 is actuated when the system is on line, then the master controller will perform restore functions when the host computer makes no demands. When a command is received from the host computer, under these conditions, the master controller will store the command momentarily while completing a sector of restoring, and then switch over to normal storage operation under control of the host data processor. Upon the occurrence of the next time interval, when the host computer makes no demands upon the storage system, the master controller will resume restoration of data in the newly substituted drive unit, with data regeneration being accomplished as discussed below in connection with FIGS. 7A through 7F.

Concerning the display 106 and the signal lights 112, when the system is operating perfectly, the top three signal lights 122, 124, and 126 involving (1) power, (2) ready, and (3) on-line, will be lit, and the other LEDs in the array 112 will be off. In addition, the display 106 will bear the legend, "SYSTEM RUNNING" Normally, under these conditions, the cover 116 will be in place, and the LED array 112 will be visible through the openings 118 in the cover 116. The legends shown in FIG. 3 are of course also repeated on the cover 116. As long as the upper three LEDs are lit, and the lower three LEDs are not energized, there is no need to remove the cover 116.

The system of the present invention is operative, even when the system develops certain faults, even to the extent of one of the drive modules having completely failed. With various minor malfunctions occurring the system, the "Fault" LED 134 will be energized, and either turned on continuously, or will be blinked, in some cases in combination with blinking of the "On-Line" LED 126.

In Appendix I attached to this patent application is a Table setting forth the pattern of LED energization, and the message which will appear on the LCD display 106, when various faults occur. Thus, for example, the third entry in Appendix I indicates that the power and the on-line LED's 122 and 124 are "on", but the "Ready" and the "Fault" LED's 124 and 134 are blinking. In addition, the LCD message will state "CH#__ ER:03 and "REPLACE CH #__". As indicated in the description, the fault which has been found is that "No index or sector signal is found; error channel will be powered down". In practice, when the operator sees the "Ready" and the "Fault" signals blinking, the cover 116 of the storage system will be removed, so that the LCD display 106 may be observed. Once the operator observes that a particular channel must be replaced, this action is accomplished, using the handles 84, as shown in FIGS. 2B and 4. Incidentally, in order to pull out either of the two right-hand drives, the display and switch panel must be pivoted forward, hinging about the hinge 98 as shown at the upper right-hand FIG. 2B.

Following the substitution of a new drive module including standard drive and the associated formatter, the system may continue on-line, with restoring being accomplished during intervals when the host computer is not accessing the storage system, as mentioned above. Alternatively, the system may be taken off-line, and the information which either had been stored or had been intended for storage on the failed drive may be entered into the newly replaced unit.

In other cases, when the system has a malfunction, but not a failed drive, it may be appropriate to undertake diagnostic tests to ascertain the problem.

The front panel diagnostic is an off-line series of programs which will perform basic testing of the system. Their main purpose is to verify the pass/fail status of the various components of the system at as low a level as possible to identify failed components and restore the system to full operation as quickly as possible. The tests available through the front panel diagnostics are designed to test specific features. These tests will be on a lower level than the system diagnostic tests run from the host computer. All diagnostic functions are input through the numeric keypad 140 on the front panel and all results are displayed on the 32 character LCD display 106, or in the LEDs in the array 112. All tests are run individually as they are selected, with no preselect, or initialization, as is customary in system diagnostics run from the host computer.

Testing is in two main areas, the master controller, and the channel controller/disk drive assemblies. The master controller tests include separate tests for the major hardware blocks, including the sequencer, the "first-in, first-out" (FIFO) buffer store, the random access memory (RAM) and the interface controller. The channel controller tests will involve low level commands to the channels using the master controller to channel formatter interface.

Control of the master controller will be passed on to the front panel diagnostics, when the on-line/diagnostics switch 146 is actuated. The LCD 106 is then cleared and a "?" is displayed as a prompt for diagnostic function code entry. There will be no changes in the status of the drives or the LEDs. After initial setup is complete, the diagnostic will be in an idle loop, waiting for input from the keypad 140.

All test function codes are two digit codes. The digits will be echoed or displayed, on the LCD as they are entered. An attempt to enter a digit that does not form a valid diagnostic function code will not be accepted. After a valid function code has been entered, the test name will be displayed in the LCD following the code.

Pressing the "Enter" switch 142 will cause the execution of the test. Pressing the "Restart" switch 144 before the "Enter" switch 142 is actuated will clear the liquid crystal display for receipt of a new function code. If the "Restore" switch 148 is actuated, the diagnostic monitor will check the bad channel status byte in the master controller memory. If one and only one channel is indicated as being bad, a normal restore operation will be performed, as described hereinbelow. Otherwise, the actuation of the restore switch 148 will be ignored.

Several of the channel controller/disk drive tests require operator input before the tests are executed. After entering the diagnostic function code and pressing the enter switch 142, any required input will be prompted by an indication on the second line of the LCD 106.

Actuating the on-line/diagnostic switch 146 for a second time will abort testing, and jump to the initialization routine for the master controller.

A number of specific diagnostic codes are set forth in Appendix II to the present patent application.

FIGS. 5A through 5E are circuit diagrams for the printed circuit board 104 as shown in the upper right-hand side of FIG. 2B, relating to the signal lights and the diagnostic panel. FIGS. 5A through 5E are a series of five sheets of drawing which should be placed side-by-side in a single row, with FIG. 5A on the left and 5E on the right.

Figure 5A:
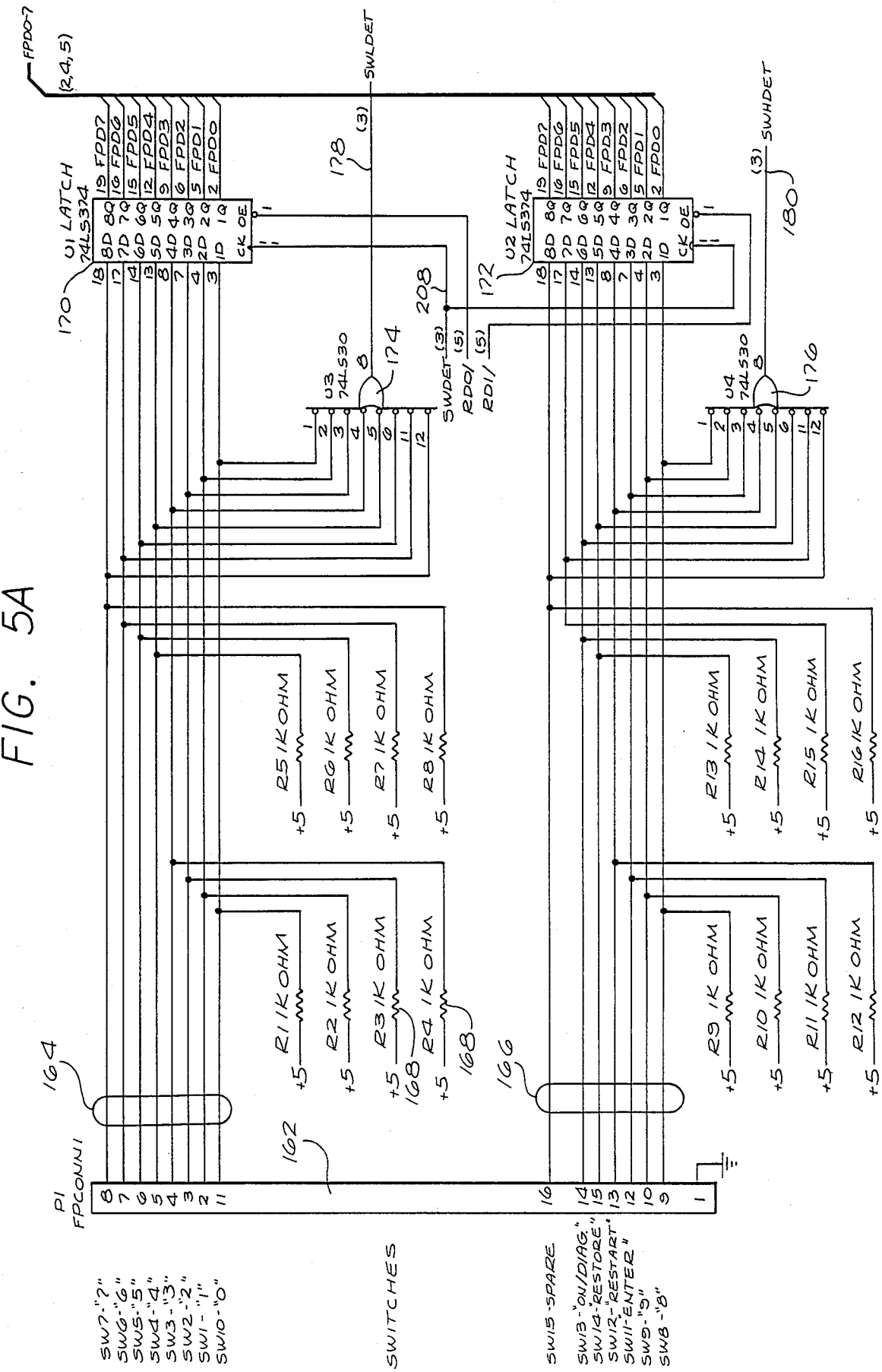
FIGS. 5A through 5E together form a circuit diagram showing the control wiring for the signal lamps and related circuitry of the control panel.

Referring initially to FIG. 5A, the switches on the front panel are indicated diagrammatically by the block 162 at the far left in FIG. 5A. When any of the switches are actuated, the leads coupled to the individual switches are grounded. Normally, each of the leads in the groups 164 and 166 are at a +5 volt potential, with this +5 volts being applied through the 1 ohm resistors such as those shown at reference numeral 168. When any one of the switches is actuated, this actuation is detected and held in one of the latch circuits 170 and 172. Two OR circuits 174 and 176 are provided, and if any of the switches in the group 164 is actuated, a signal is supplied on the switch detection output lead 178. Similarly, if any of the switches in the group 166 is actuated, an output signal indicating the actuation of the switch is applied to lead 180 at the output from the OR gate 176.

Figure 5B:
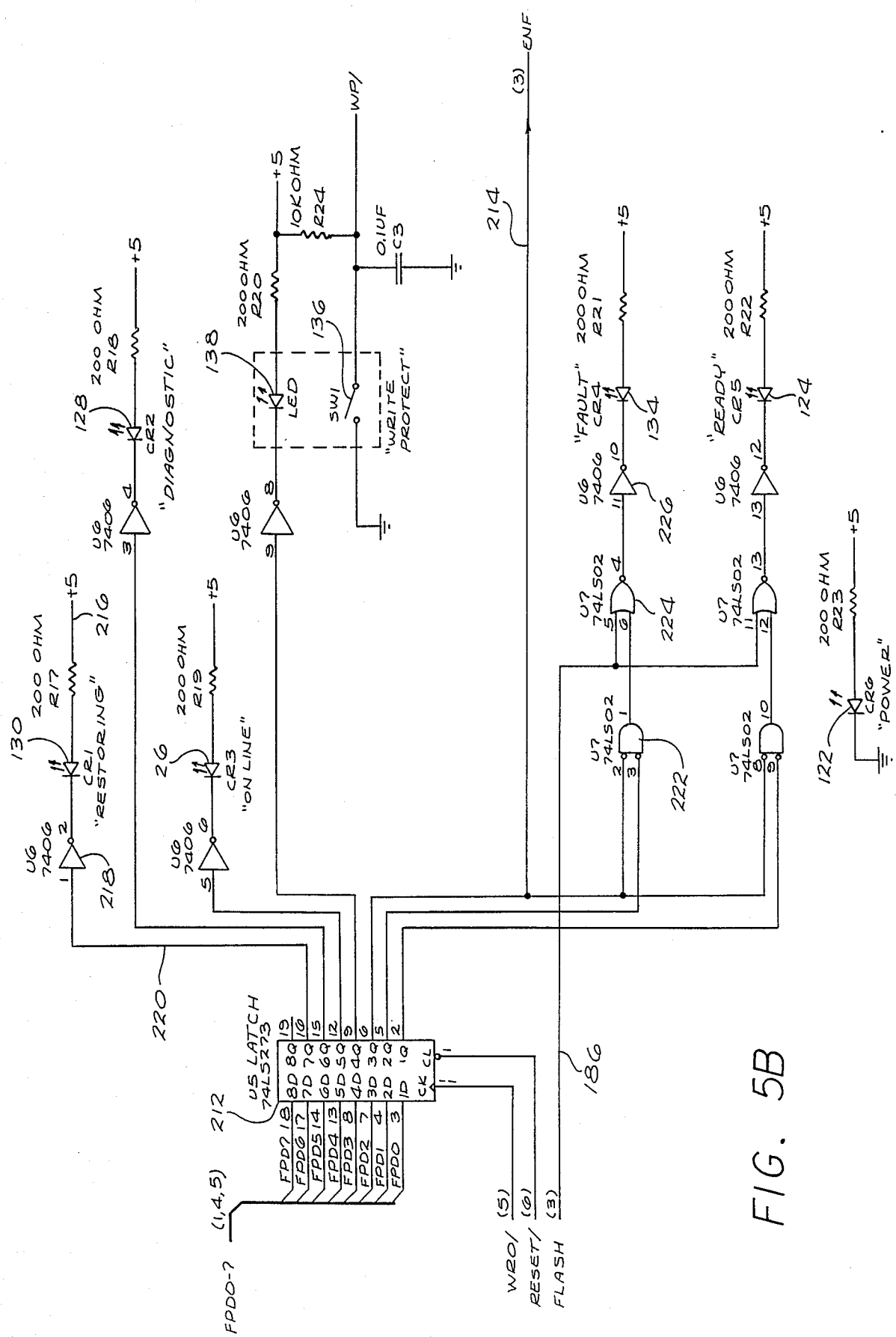
Figure 5C:
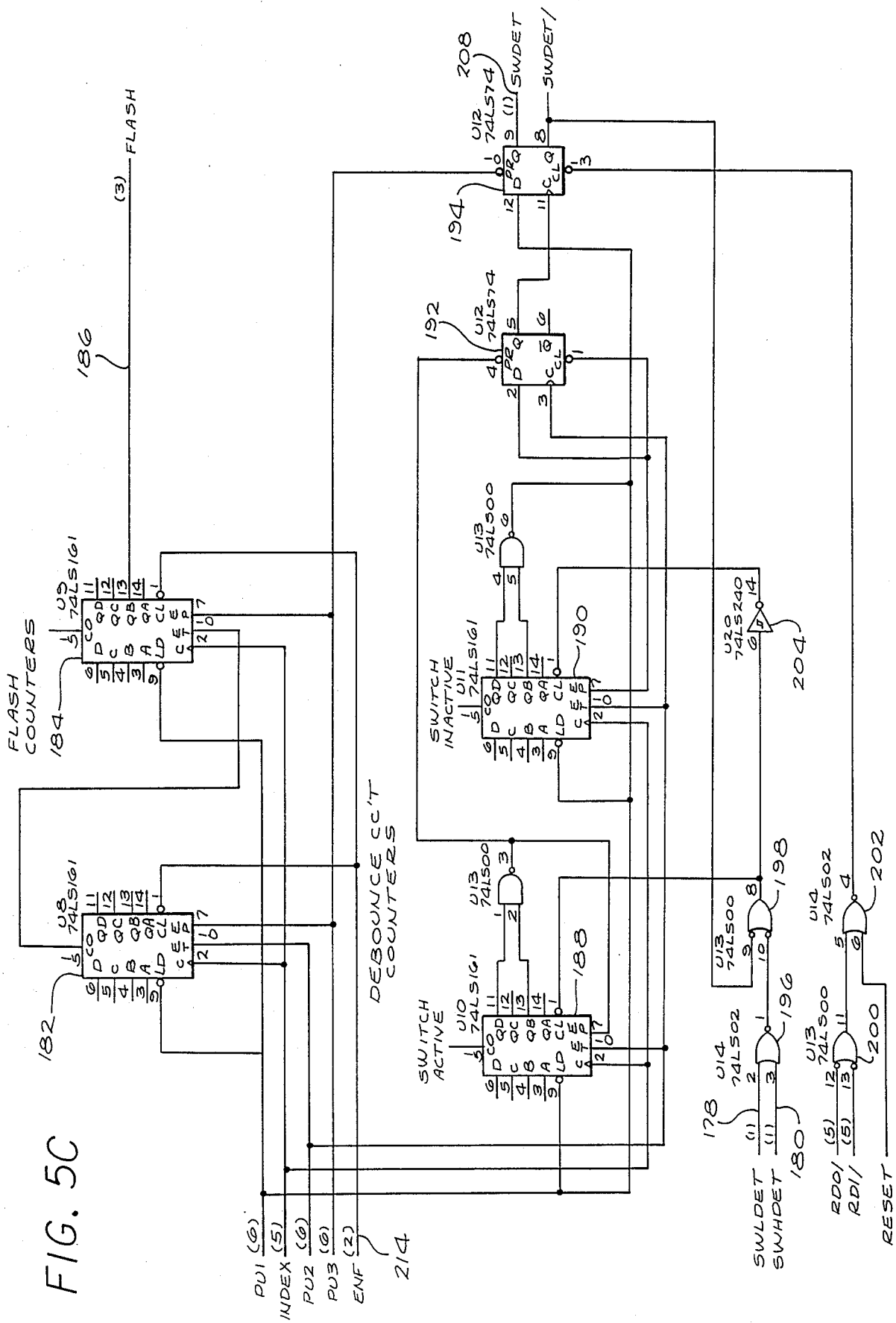

FIG. 5C includes two counters 182 and 184 which take the relatively high repetition rate signal which provides indexing pulses to the individual drives, and counts it down to a relatively low frequency to produce flashing impulses on the lead 186. This signal is in turn employed to control the blinking of the "Ready" light-emitting diode 120 and the "Fault" LED 134 under certain fault conditions, as discussed hereinabove.

Additional circuits included in FIG. 5C include the counters 188 and 190, the flip-flops 192 and 194 and the OR circuits 196, 198, 200 and 202. Incidentally, the small circles adjacent the OR gates indicate inversion of the signal at the point indicated by the circle. On an overall basis, the circuitry serves to verify that the switches are being intentionally activated and that the sensed signal is not merely a transient, an accidental bumping of the switch. More particularly, unless the switches remain closed for about 1/5 of a second, the circuitry does not provide a positive signal on lead 208 indicating that positive switch actuation has occurred. However, if the signal does last for this period of time, the signal is provided from flip-flop 194 (FIG. 5C) to lead 208 of FIG. 5A, so that the output of latch 170 may be read by the master controller.

Incidentally, some of the leads have numbers in parenthesis adjacent the leads where they leave one page and proceed to another page. Thus, the lead 178 has the number (3) adjacent to the lead at the point where it enters FIG. 5A. As noted above, at the lower left in FIG. 5C, the lead 178 is shown with the number (1) adjacent the point where it enters the page. For the purposes of FIG. 5A through 5E, these successive sheets are designated by successive numbers 1 thru 5, and these numbers in parenthesis indicate the draw sheet to which, or from which, each lead extends.

Now, turning to FIG. 5B, the latch 212 is operated from the master controller 14, as shown in FIG. 1. In FIG. 5B, all of the light-emitting diodes in the array 112 of FIG. 3, and also the Write Protect LED 138 are shown. It is noted in passing that the Write Protect switch 136 is, of course, closely associated with the LED 138 which is energized when the Write Protect switch is closed. Also to be noted in FIG. 5B is the enable flasher output lead 214 which appears to the left in FIG. 5C, and which enables the counters 182 and 184, and without which the flasher signals on lead 186 do not occur. Incidentally, returning to FIG. 5B, the flash input signal appears on lead 186. As previously discussed, when certain types of faults arise, the Fault LED 134 and the Ready LED 124 are flashed or blinked to direct attention of the operator to certain types of faults.

Concerning the operation of the individual LEDs, such as the LED 130, it has 5 volts applied to it on lead 216, through an associated resistor. Under normal circumstances when the light-emitting diode 130 is "off", the output from the inverter 218 is high, and the input from the latch 212 is low. When the output lead 220 from the latch 212 is energized, and goes high, the output of the inverter 218 approaches ground potential, and the LED 130 is turned on. Similarly, the AND circuit 222, the OR circuit 224, and the inverter 226, together with the associated input leads control the operation of the fault LED 134, and the ready LED 124 is controlled in a similar manner.

Figure 5D:
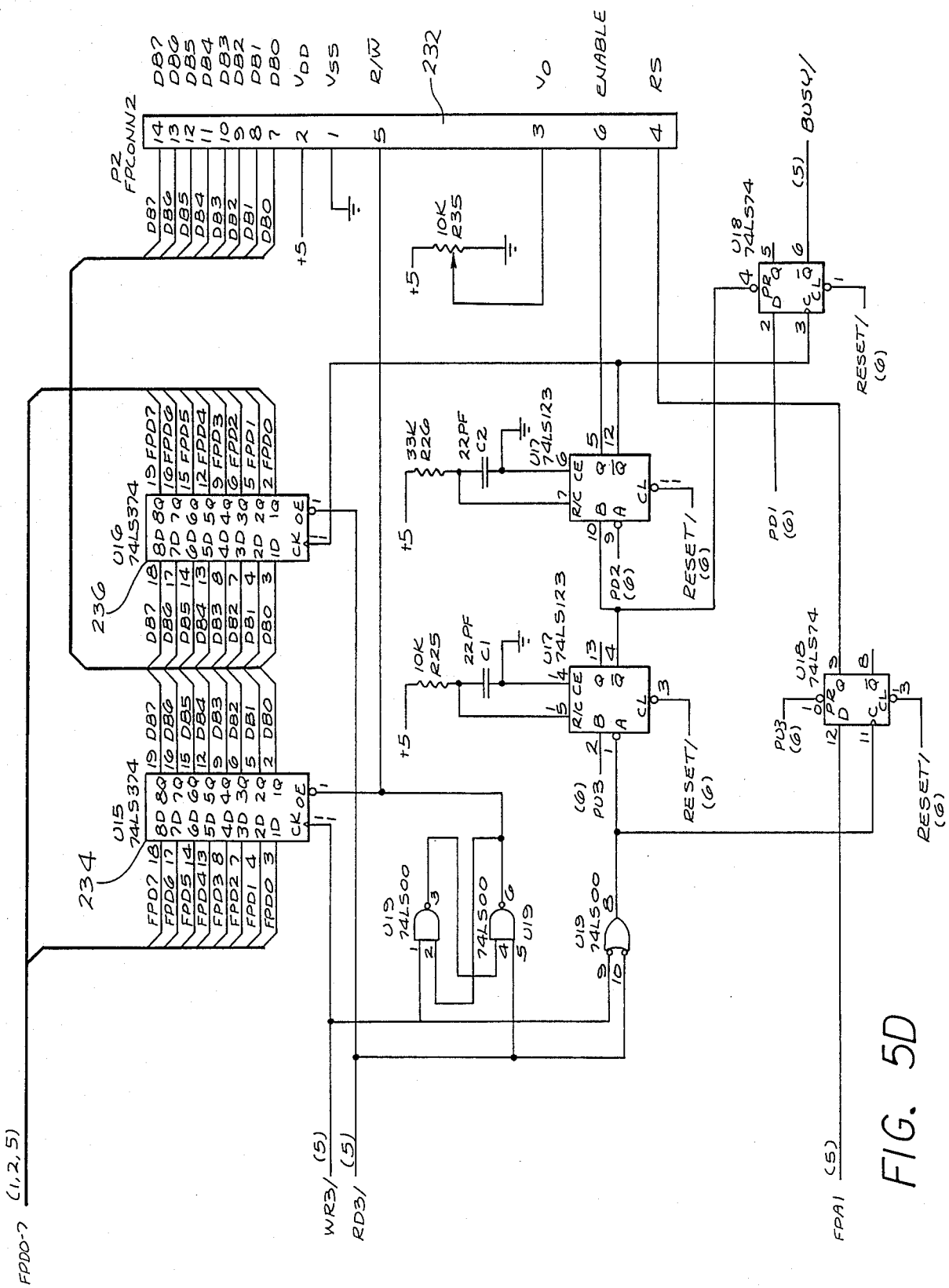
Figure 5E:
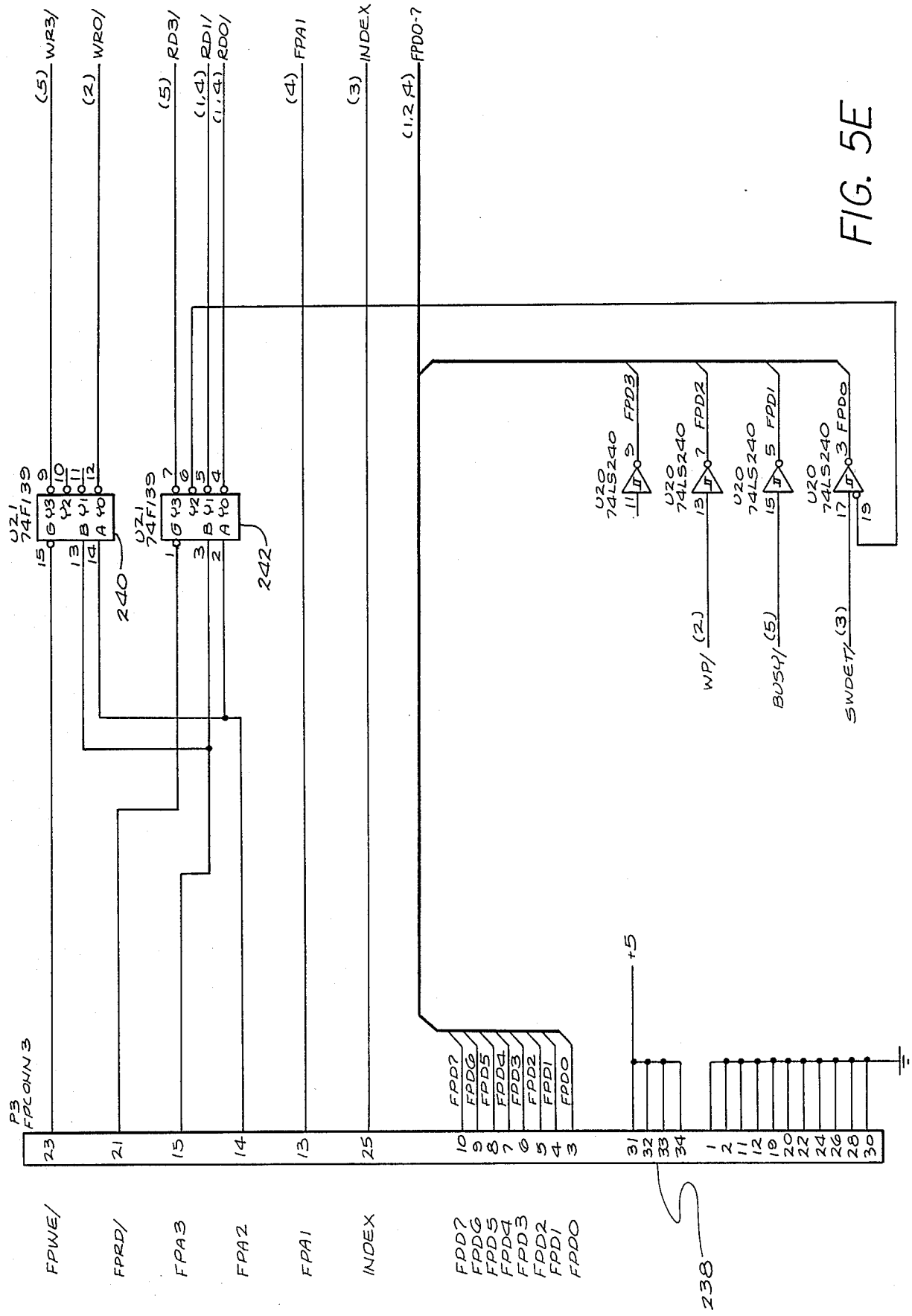

Now, referring to FIG. 5D of the drawings, the connector 232 couples to the liquid crystal display 106, as shown in FIGS. 3 and 2B. The latches 234 and 236 hold data for display by the liquid crystal display. The remaining circuitry shown in FIG. 5B is normal logic circuitry for controlling the LCD. In FIG. 5E the connector 238 couples to the master controller, and the circuits 240 and 242 involve decoding signals from the master controller in addressing the signal and control panel.

Figure 6A:
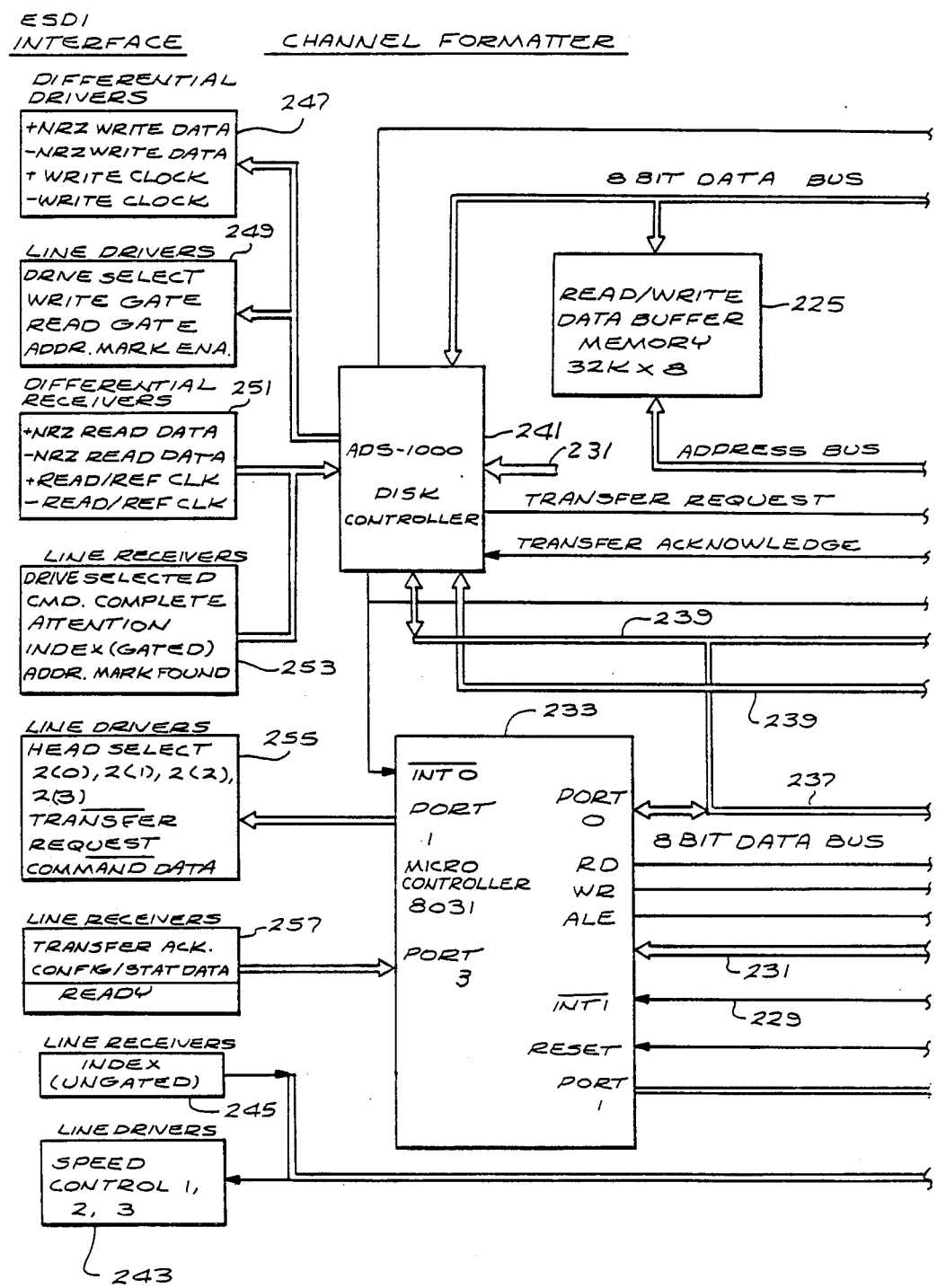
FIGS. 6A and 6B together form a block circuit diagram of a channel formatter associated with each of the drive units.
Figure 6B:
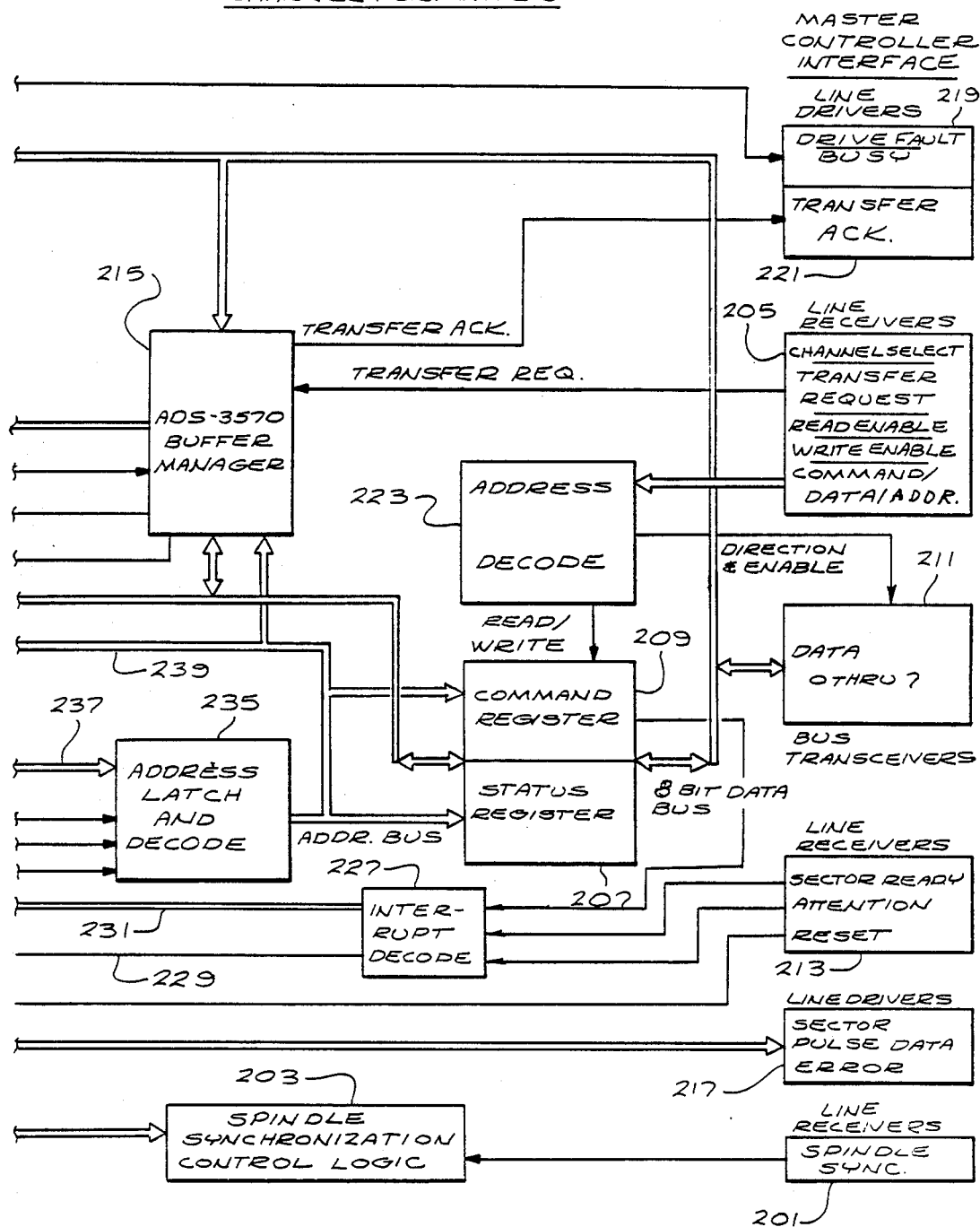

FIGS. 6A and 6B together represent the channel formatter, and there are five of them provided, one of them for each of the five drives. In FIG. 6B, the master controller interface appears to the right in FIG. 6B, and the interface with each of the drives appears to the left in FIG. 6A. In considering first the master controller interface, the lowermost block 201 to the right in FIG. 6B represents the spindle synchronization circuitry which provides pulses for synchronizing the spindles of each of the five drives so that they rotate substantially synchronously. The spindle synchronization control logic, indicated schematically at reference numeral 203, in FIG. 6B will be discussed in greater detail hereinbelow.

The block 205 represents line receivers included in the formatter. Included in the line receivers is the "channel select" line receiver which enables all the other line receivers and line drivers of the channel formatter. The "transfer request" receiver is intended to receive a signal which indicates that the master controller wishes to transfer data either to or from the formatter. The Read Enable and the Write enable line receivers indicate that the master controller wishes to either read information from the status register 207, or write a command into the command register 209. The command/data line receiver is still another dedicated receiver which indicates the desired state of the data bus as to whether it is transmitting or receiving data or whether the channel formatter is in the mode to receive commands or indicate status.

Block 211 represents a set of bus transceivers for transmitting a byte of information including bits 0 through 7, in either direction.

The block 213 contains a "sector ready" line receiver to receive the request from the master controller that the formatter should prepare to receive or send a block of information which might occupy a sector of space on the disk drive. If the buffer 225 has sufficient space available to receive a block of information, from the master controller, or if the buffer 225 contains a block of information to be sent to the master controller, a "sector pulse" will be supplied to the master controller, as indicated by the line driver block 217. Along with the sector pulse, which applies only to disk read operations, the "data error" line driver block 217, is updated to convey the data error status for the next block of data to be transferred to the master controller.

Returning to the line receiver block 213, the "attention" designation indicates a receiver which is energized to indicated that the master controller is requesting the channel formatter to perform one of the four predetermined attention commands. The "reset" line receiver indication within the block 213 represents a priority signal which resets the channel formatter or initializes it back to a known state.

Turning to the uppermost block 219 at the far right in FIG. 6B, the line driver indicating "Drive Fault" indicates that the drive will be unable to process the command as requested by the master controller. The "Busy" line driver provides an indication that the channel formatter is still busy with a prior command, and is not available to process a new command at this time.

The "Transfer Acknowledge" line driver 221 is employed to acknowledge transfer requests from the master controller and the indicated that the formatter is prepared to transfer the particular byte of information under consideration.

Turning now to the address decode block 223, this circuit selects the particular command register or status register with which the master controller shall communicate.

The buffer 225 in FIG. 6A has a capacity of 32,000 bytes of information, and is controlled or managed by the buffer manager 215. Normally, a block of data is stored in the buffer 225, and is then transferred into the drive, in a location previously supplied by the master controller, and stored in the command register 209.

The interrupt decoder 227 receives interrupt signals, either from the circuitry 209, or from block 213 indicating "Sector Ready" or "Attention", as discussed above. The interrupt signal from block 209 indicates "command". This interrupt is generated when the master controller completers writing to the command registers (six bytes). The channel formatter, upon detecting command interrupt, will read command registers and perform the task requested, and report the command completion status by writing to the status registers. The interrupt decode circuit 227 transmits an interrupt signal on the lead 229 and an identification of the nature of the interrupt on the bus 231. Upon receipt of the interrupt signal and the identification of the nature of the interrupt, the microcontroller 233 responds, and orders an implementation of the interrupt request. In the operation of the microcontroller, the address latch and decode circuit 235 receives address information from the microcontroller on the bus 237 and latches it on the address bus 239. Data is then transmitted over the data bus 239 between the microcontroller 233 and any of the coupled circuit represented by the blocks 207, 209, 215, or the disk controller 241.

Consideration will now be given to the circuits which appear as blocks at the left-hand side of FIG. 6A and which are coupled to the individual disk drive, by way of an ESDI, (Enhanced Small Disk Interface).

With regard to the lowermost two blocks 243 and 245, these involve the transmission of spindle motor control signals to the disk drive, and the return of speed and position indicating signals from the disk drive in order to provide spindle synchronization, all of which will be set forth in greater detail hereinbelow.

Turning now to block 247 at the upper left of FIG. 6A, the differential drivers indicated by this block actually transfer the data to the disk drive, and this includes the NRZ (non-return to zero) data synchronized by the clock signals.

The second block 249 at the upper left in FIG. 6A shows the line drivers including the "Drive Select", the "Write Gate", the "Read Gate", and the "Address Mark Enable" line drivers. This involves the necessary initial signal to select the drive, the Write or Read Gates are enabled to indicate that either a Write or Read operation is taking place, and the "Address Mark Enable" driver indicates that the beginning of a sector of information is being noted on the recorded information on the disk.

The block 251 involves differential receivers, which essentially perform functions which are the inverse of the functions indicated in block 247 involving the reading of data instead of writing it.

The line receivers indicated by the block 253 indicate communication between the channel formatter and the control functions included in the drive. More specifically, the signal received on the "Drive Selected", line receiver is essentially an acknowledgment of the "Drive Select" order noted in block 249. The "Command Complete" line receiver energization indicates that the command which has been requested has now been fully accomplished.

The "Attention" line receiver actuation would indicate to the formatter that a change in situation has occurred within the disk drive. The "Index" signal indicates the orientation of the disk relative to the heads. The signal received on the "Address Mark Found", line receiver conforms to the address marks indicating the beginning of a sector previously mentioned.

The line drivers indicated in block 255 include drivers that select which of the heads and the corresponding disk surfaces of the drive are to be read or used for recording of data. Thus, the Series 1500 Micropolis drives normally have eight disks and sixteen heads associated respectively with the individual surfaces of the disks. The line driver involving a transfer request is enabled to indicate that command data is to be transferred from the formatter to the disk drive electronics or that status information is to be transferred back from the disk drive electronics to the formatter. The actual command information is transferred bit by bit by the "Command Data" line driver.

The first receiver included in block 257 involves the "Transfer Acknowledge" line receiver, which receives the acknowledgment from the drive electronics that it has received the transfer request; and the "Configuration Status Data" line receiver receives the status data from the drive electronics indicating its configuration status. The "Ready" line receiver is a simple, overall indication from the drive electronic that the drive is prepared to receive commands from the channel formatter.

Figure 7A:
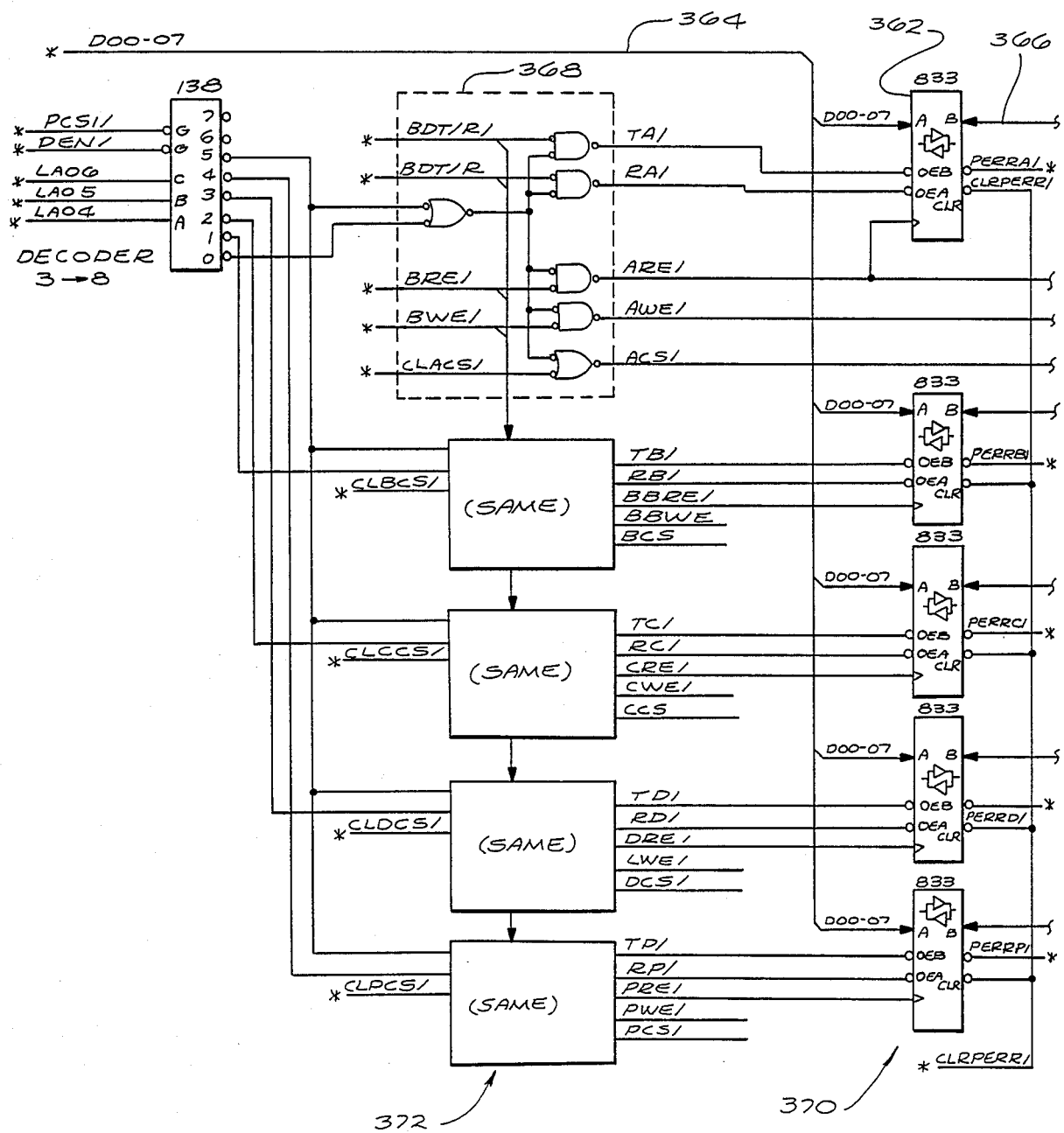
FIGS. 7A through 7F constitute a circuit diagram of the data path circuitry of the master controller.
Figure 7B:
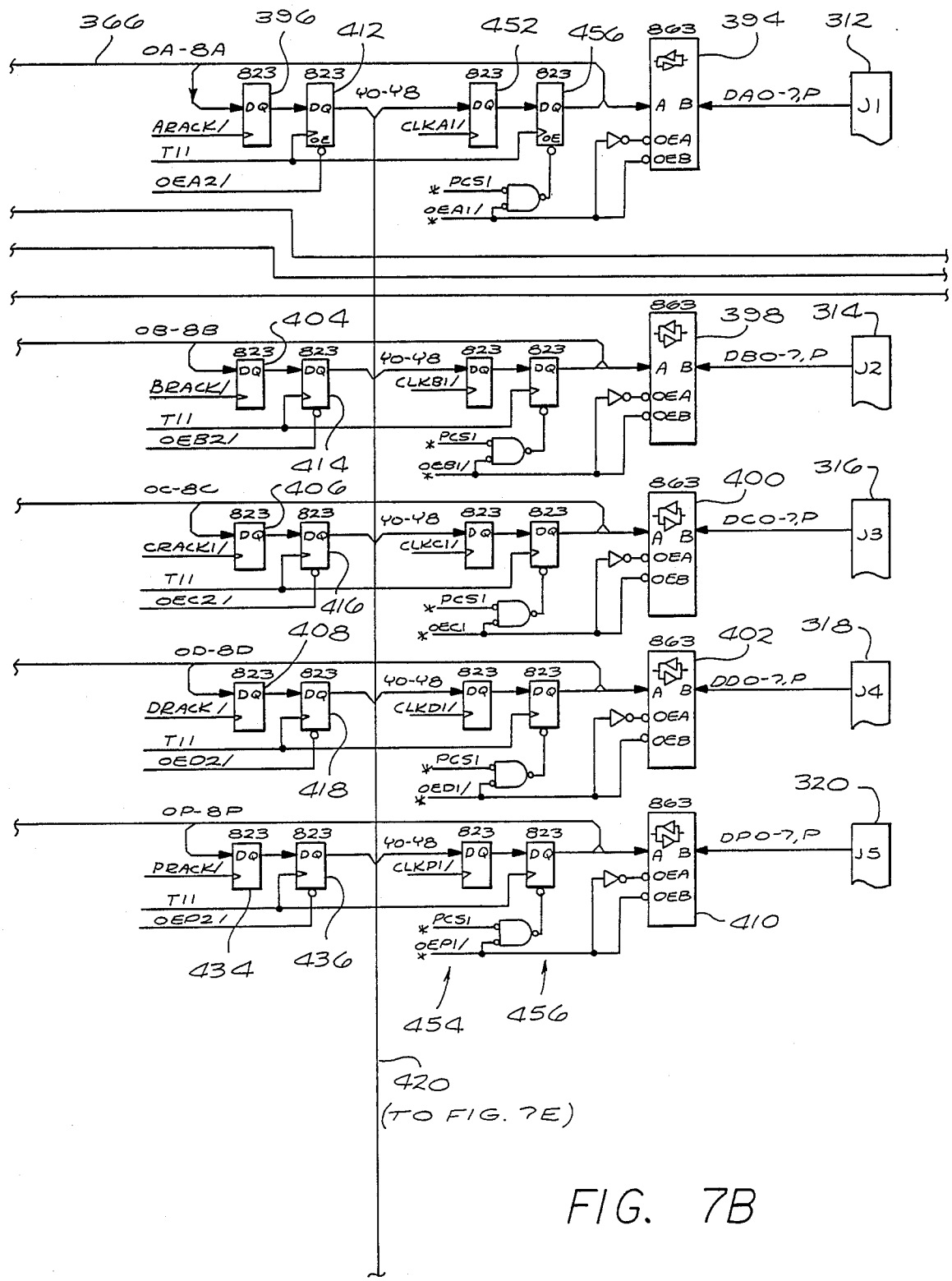
Figure 7C:
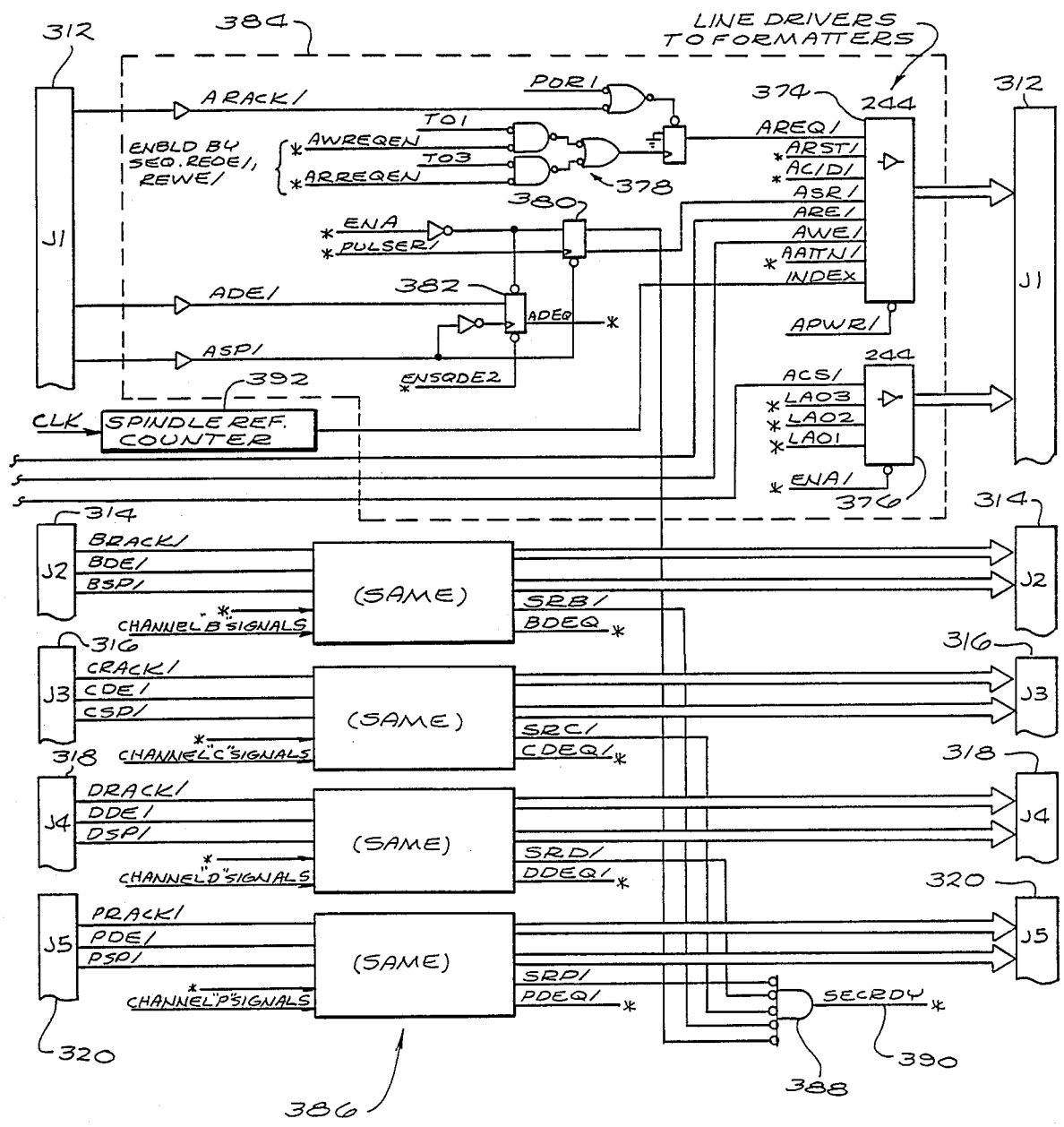
Figure 7D:
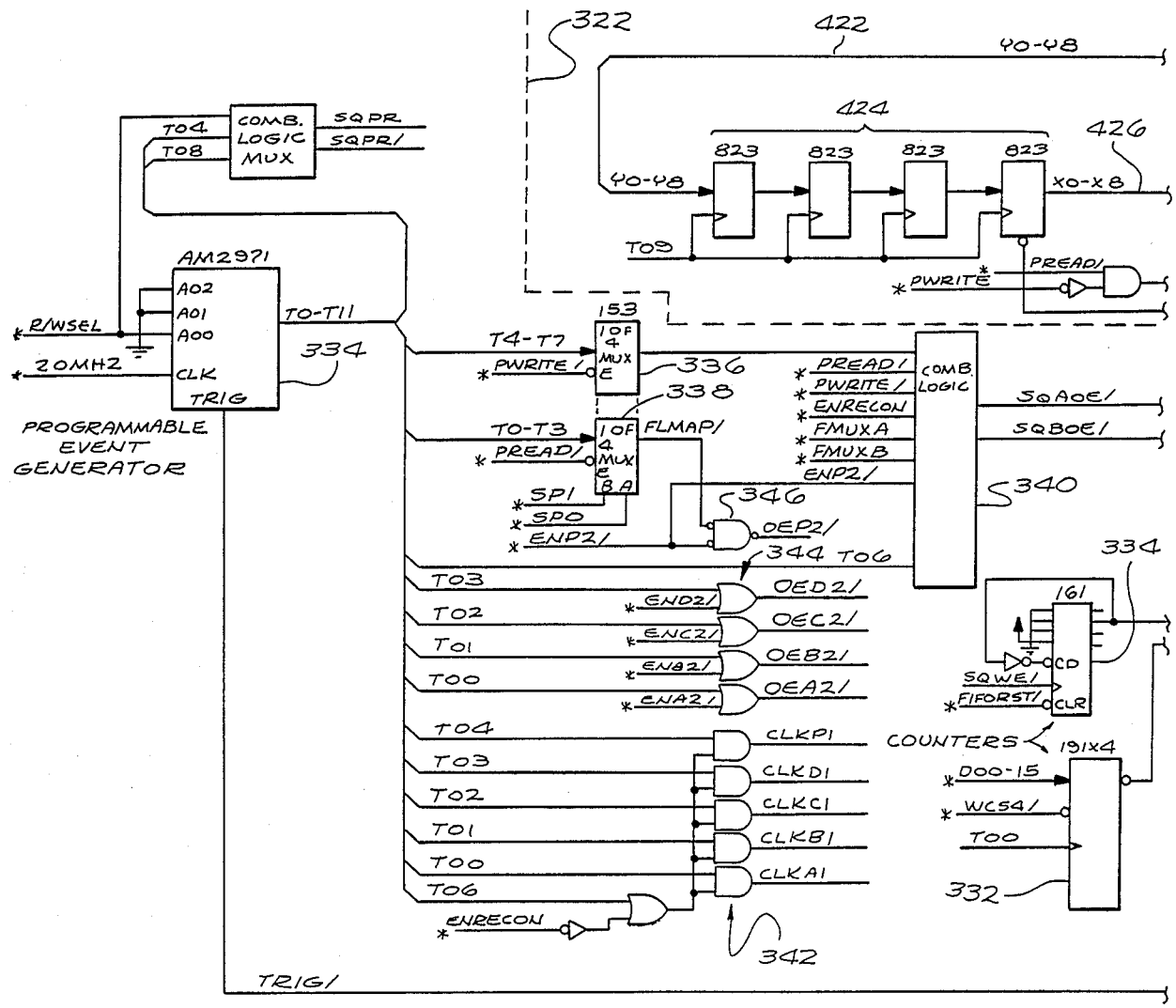
Figure 7E:
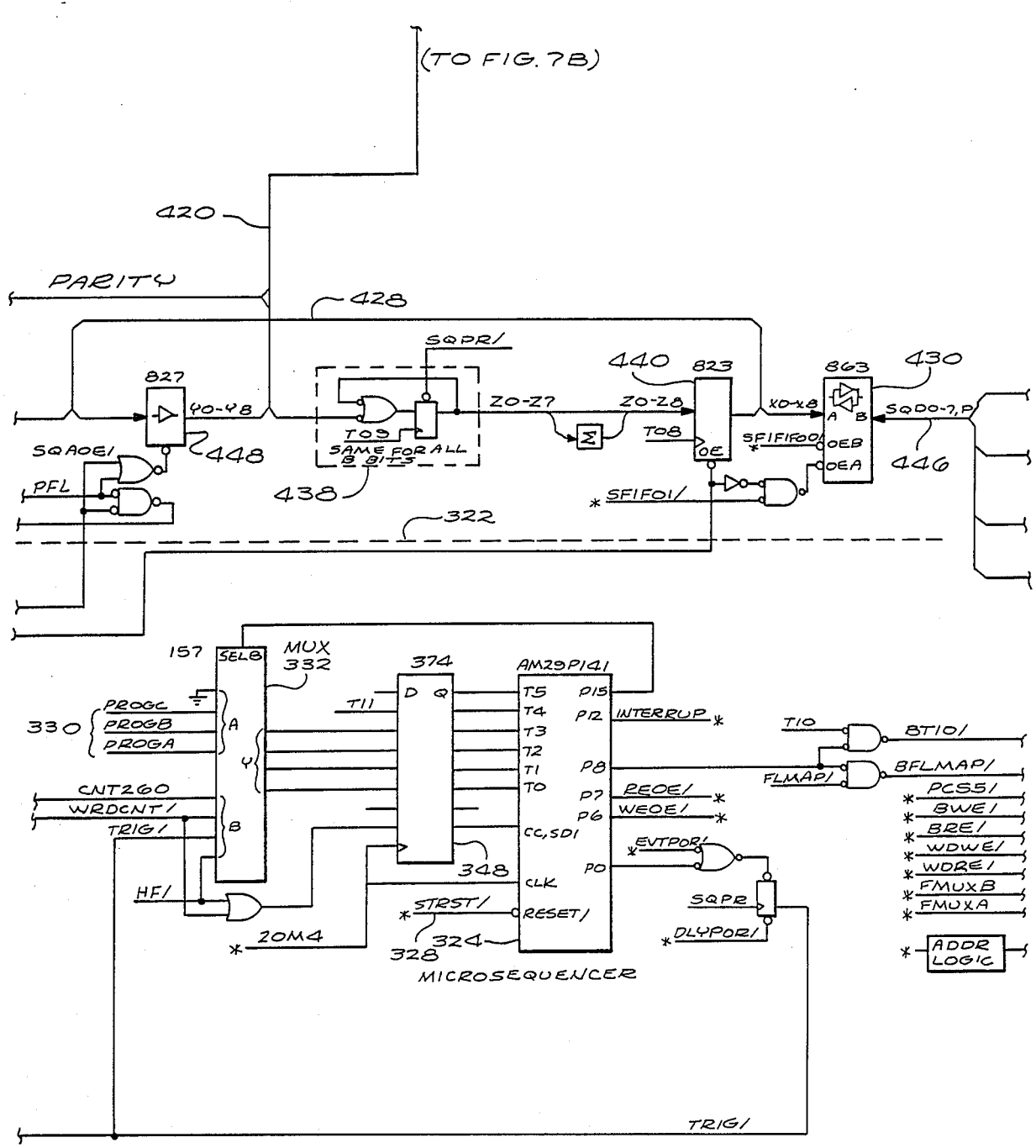

The master controller will now be described in connection with FIGS. 7A through 7F of the drawings, and subsequent figures of the drawings. More specifically, FIGS. 7A through 7F relate to the data path, while subsequent figures of the drawings relate to the CPU and control functions of the master controller. FIGS. 7A, 7B and 7C should be associated side-by-side; and then FIGS. 7D, 7E and 7F are to be located side-by-side, and immediately under FIGS. 7A, 7B and 7C.

Figure 7F:
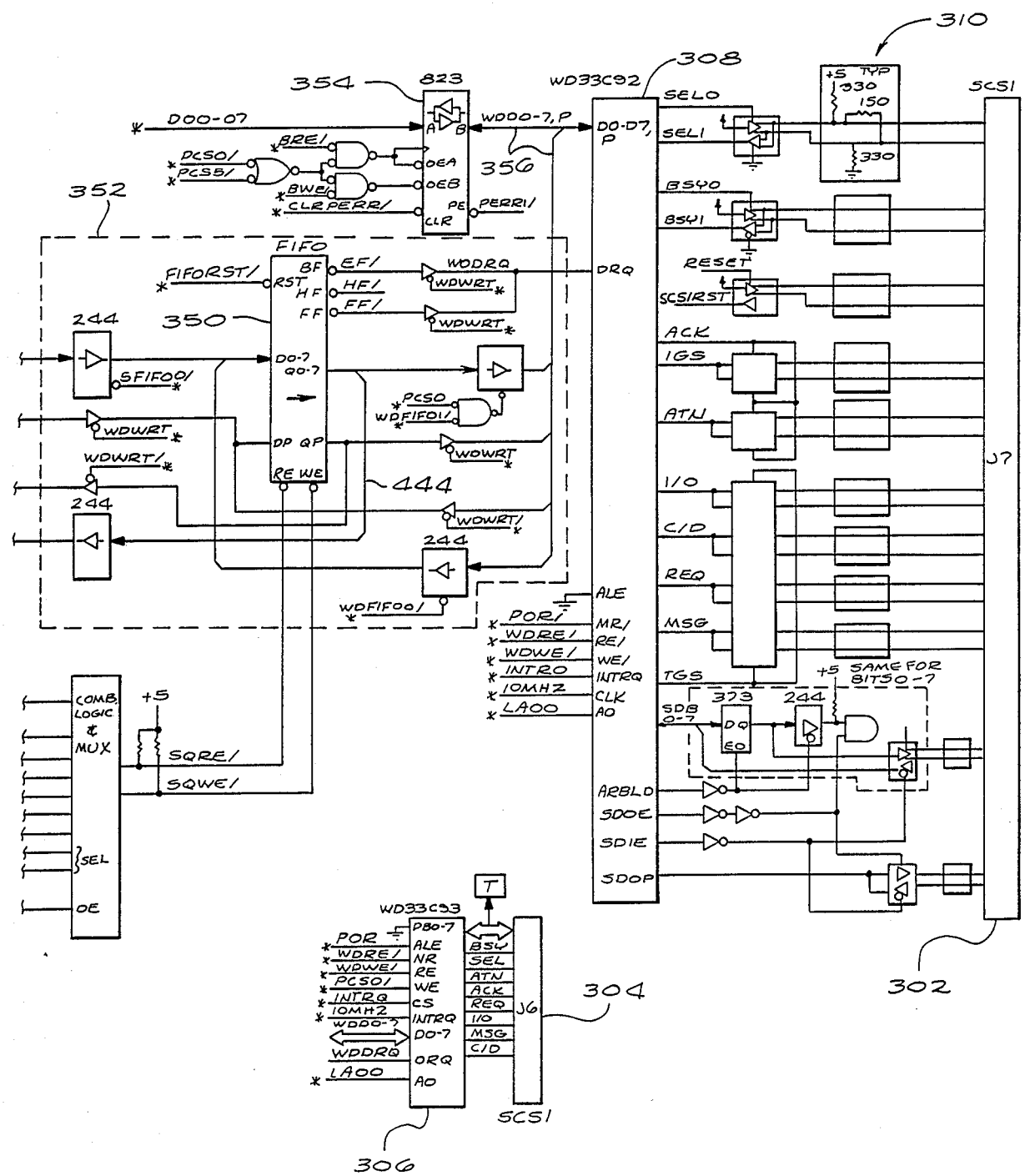

Considering FIG. 7F, the connections to the host computer are shown in this figure. More specifically, the connector J7 designated by reference numeral 302 is a differential coupling to the host computer, using two wires for each signal; while the connector 304 is single ended, or uses one lead for each signal connection. Associated with the connector 304 is the SCSI controller 306. Circuit 306 is a standard chip which is a microcontroller and handles the protocol of the SCSI interface. The SCSI microcontroller 308 associated with the connector 302 is similar to the simpler SCSI microcontroller 306, but has the differential output connections as required for the two wire or differential output. In addition, between the SCSI controller 308 and the connector 302 is differential driver circuitry 310 providing sufficient power to transmit the signals from the connector 302 for a distance of up to 25 meters.

Now, the master controller data path circuitry included in FIGS. 7A through 7F intercouples the host computer, coupled to the connectors 302 or 304, with the five formatters associated with the individual drives. The connectors for the individual drives appear in FIGS. 7B and 7C, and the same connector for each of the five drives appears once to the right in FIG. 7B and twice in FIG. 7C, both at the left-hand side of FIG. 7C and at the right thereof. The connector for the first formatter is designated by the reference numeral 312, and the connectors for the remaining four formatters are designated by the reference numerals 314, 316, 318 and 320.

We have noted above the connection to the host computer, and the connection of the data path circuitry with the five individual formatters associated with the five drives. The signals from the host computer are broken up and routed to the individual formatters on a byte-by-byte basis, and we will now consider the circuitry which selects which of the formatters will be selected, during successive time intervals. In FIGS. 7D and 7E, the dashed line 322 separates the sequencer circuitry which lies below the dashed line 322 with the parity generation and the data restore circuitry which lies above the line 322.

Figure 8A:
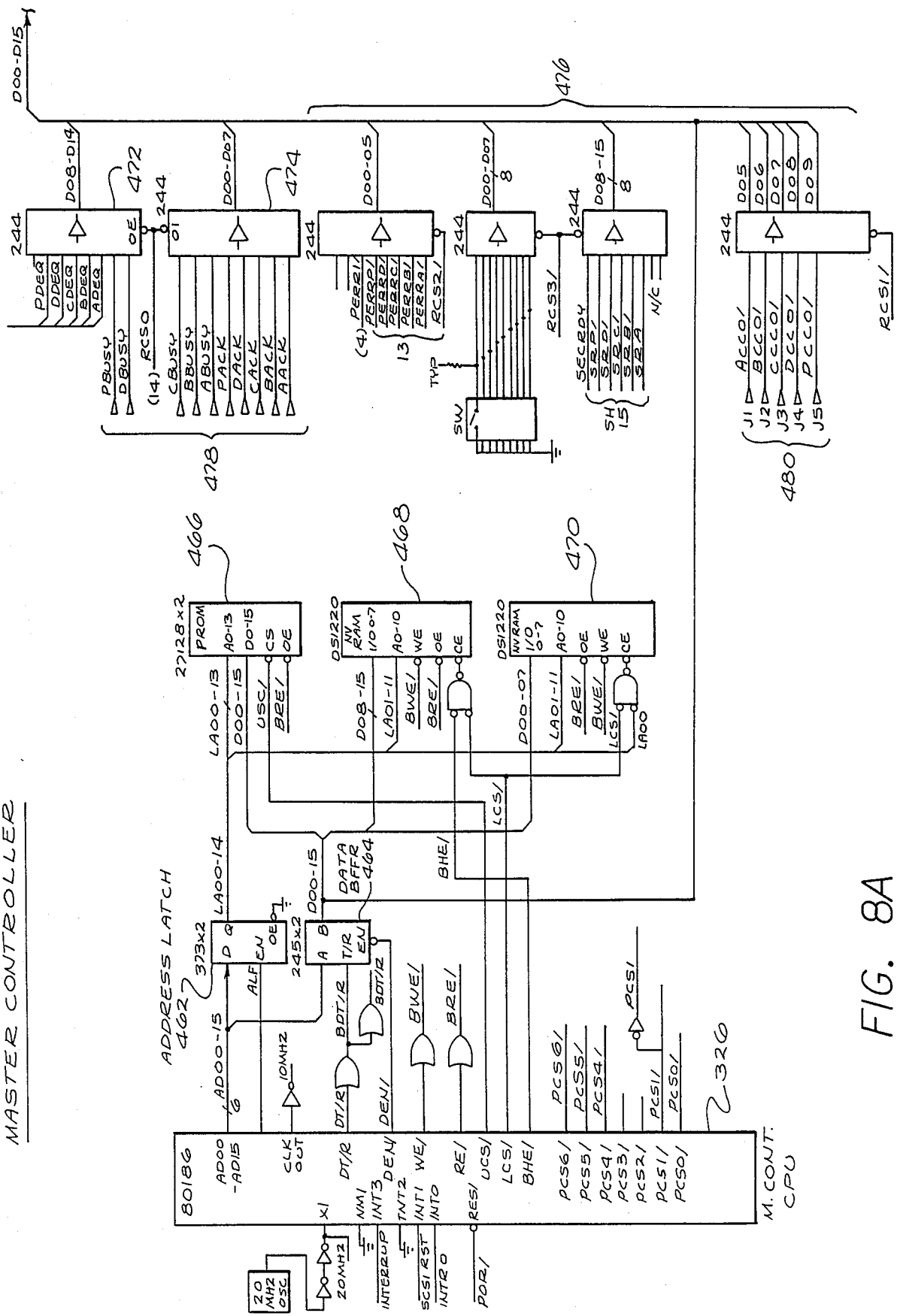

Now, considering the sequencer circuitry, the lower portion of FIG. 7E includes a microsequencer 324 which initiates the transfer of data to and from the formatters, counts the data transfers and then terminates the transfer of data. Incidentally, the master controller CPU, which appears in FIG. 8A which will be discussed in greater detail below, designated by the reference numeral 326, has as one output on lead 328 on FIG. 8B a signal designated "STRST" which is an input to the microsequencer 324. Additional inputs to the microsequencer circuitry include the program leads 330 which appear in both FIG. 7E and also FIG. 8B provides additional inputs through the multiplexer 332 to the microsequencer 324. When a start signal is applied to lead 328, the microsequencer 324 reviews the program inputs 330 and starts its program operation. Thus, by way of example, it initiates the operation of the counters 332 and 334 which count the number of transfers to and from the formatters, and indicate to the microsequencer when the terminal count is reached, and the microsequencer then terminates its operation relating to that particular transfer.

The microsequencer 324 also enables the programmable event generator 334 which forms part of the timing control circuitry occupying the lower half of FIG. 7D, which determines which of the formatters is receiving data at any particular time. Additional outputs from the programmable event generator extend to the multiplexers 336 and 338 which are coupled to the combinational logic circuitry 340, which in turn controls the operation of the parity circuitry which appears above the line 322 in FIGS. 7D and 7E. As will be discussed at greater length hereinbelow, when it is desired to restore data from a failed drive, or otherwise utilize the parity information, this circuitry comes into play. With regard to the gates 342, timing signals are provided to these gates by the programmable event generator 334, and the master controller CPU 326 (see FIG. 8A) provides enabling signals to the various gates. Normally, when there are no system malfunctions, the five formatters, and the associated four data drives and the one parity drive, are operated in parallel, but with successive bytes of information from the host computer being routed to successive ones of the data drives. However, if one of the drives fails, for example, then the one of the drives which has failed, will be disabled by enabling one of the four OR gates 344, and enabling the parity formatter and drive unit by energization of the AND gate 346. In addition, as developed below, the parity signal is employed in combination with the data from the other three drives, to develop the signal which was intended to be stored on the failed drive, thus producing restored data.

Incidentally, concerning one other circuit in FIG. 7E, the circuit 348 is a buffer or synchronizing register which synchronizes the asynchronous information supplied by the multiplexer 332 with the synchronous operation of the microsequencer 324.

Now, turning back to FIG. 7F, the "FIFO" or first in, first-out register 350 stores 512 bytes of data, and serves as the buffer between the SCSI interface to the right in FIG. 7F, and the data path circuitry under the control of the microsequencer appearing below line 322 in FIGS. 7D and 7E. Incidentally, the FIFO 350 is a unidirectional component, and the associated buffer circuitry within the dashed lines 352 serve to permit its use bidirectionally, either with regard to data being transferred from the host computer to the formatters via the data path of the master controller, or vice versa. The circuit 354 is a transceiver for coupling the master controller CPU to the SCSI controller chip 308 for initialization, and so that the master controller CPU may receive status information from the SCSI controller. Further, the leads 356 permit the transfer of information from the master controller CPU to the FIFO 350 or transmission to the host computer.

We now proceed to a consideration of FIG. 7A which is essentially the circuitry which enables the master controller CPU to talk to each individual formatter or to all of them at one time. Referring to FIG. 7A, in the upper left-hand corner is the decoder 360 which decodes the three line input from the master controller CPU 326 (see FIG. 8A), which is essentially address information which selects one of eight outputs, of which six are used. More specifically, one output is employed for each of the five formatters, and a sixth output enables all of the formatters so that the CPU may give instructions to all of the formatters together.

The circuit 362 in the upper right of FIG. 7A, is a transceiver which permits the transfer of information from the master controller CPU on bus 364 to the bus 366, or vice-versa, and isolates the circuits 364 and 366 when the transceiver 362 is not enabled. The logic circuitry 368 controls the direction of operation of the transceiver 362. Additional transceivers 370 and logic circuits 372 perform the same function as described hereinabove for each of the other four formatters and associated drives.

Referring now to FIG. 7C, the circuits 374 and 376 are line drivers to the individual formatters; and the associated logic circuitry to the left of circuits 374 and 376 is "hand shake" circuitry, with the upper logic circuitry in the vicinity of reference numeral 378 serving to "hand shake" or acknowledge readiness to transfer and readiness to receive, with regard to each byte of information, and the lower circuitry 380 is a "hand shake" circuit relative to sector readiness. In this connection, a sector would involve a block of data, or the space to receive a block of data depending on the direction of transfer. The flip-flop 382 indicates that a data error is present in the data being transferred.

The circuitry within the dashed lines 384 relates to a single one of the five formatters, and the same circuitry is replicated in the circuits 386 which are shown by solid blocks with the designation "SAME" within each block. The AND gate 388 which appears toward the lower right in FIG. 7C, receives as one input, the output from the flip-flop 380, indicating that a sector is ready for the first drive. Similar outputs are provided from the "sector ready" output from each of the logic circuits 386, so that an output on lead 390 indicates that there is a sector ready on all five drives.

Concerning one additional circuit included in FIG. 7C, the spindle reference counter 392 gives one output pulse following counting of a predetermined number of input clock pulses, and this signal provides the index pulse routed to each drive for controlling its rate of rotation, and thereby synchronizes each of the drives with one another.

The circuitry forming the major part of FIG. 7B, and the upper circuitry in FIGS. 7D and 7E will now be considered in connection with a "normal read" of data from the individual drive formatters to the host computer. More specifically, on a normal read, considering the first formatter, signals come from connector 312 (FIG. 7C) through the transceiver 394 (FIG. 7B), to the register 396 where it is initially stored. In a similar manner, data from each of the other three data drive formatters arrives through connectors 314, 316 and 318, and is routed through the respective transceivers 398, 400 and 402, and is stored in the respective receiving registers 404, 406 and 408. Data from the parity check register may also be received by the transceiver 410, but if there is no indication of sector error from the flip flops such as flip flop 382 in FIG. 7C, then the data from the parity drive and formatter is not utilized. Of course, under other circumstances, when there are errors, this parity check information will be utilized, as discussed hereinbelow.

Continuing, the next step in a normal read operation, is to synchronously transfer all of the data which has been received in the registers 396, 404, 406 and 408 into the "pipeline" registers 412, 414, 416 and 418. The timing control circuit in the lower part of FIG. 7D will now successively gate the bytes stored in the pipeline registers onto the bus 420 leading to the circuitry which appears at the top of FIGS. 7D and 7E. On a normal read operation, the signals pass along the bus 422 into the delay registers 424. One byte is stored in each of the registers 424, and in the absence of errors, as discussed hereinabove, the data is routed along the path 426, 428, bypassing certain circuitry which is utilized in other operations to be discussed hereinbelow. From the bus 428, the data is transmitted to the transceiver 430 and then is coupled into the FIFO 350 for transmittal over the SCSI bus to the host computer. This completes a normal read cycle, in the absence of errors.

Now, let us assume that one of the drives such as the third drive has failed. This would involve the information which would have been received at a formatter and which would normally come in through connector J3, designated by reference numeral 316 at the right of FIG. 7C. If the third drive has failed, then under the control of the master controller CPU 326 (see FIG. 8A), the data from the third drive which is coming in on connector 316 (or which may not be available at all), will not be utilized, and instead the parity information from the parity check drive, arriving at connector J5 will be utilized to restore the missing data. In this case, the transceiver 410 will route the parity check data to the registers 434 and 436, as discussed hereinabove for registers 396 and 412, for example. In reading out the information from the three drives having valid information, and from the parity check drive, the information will be routed to the circuit 438 from the bus 420, as well as to the registers 424 via the bus 422. The circuit 438 will perform a parity sum over the information supplied by the three good drives and formatters and from the parity check drive and formatter, and will store this parity check sum in the register 440. Then, as data is being read out from the registers 424 along the bus 428, at the instant when information would normally be transmitted to the transceiver 430 originating with the failed third drive, the information from the register 440 is substituted in its place, so that the missing information is fully restored. The remainder of the operation of the circuitry is substantially unchanged. Incidentally, circuits for performing a parity check sum are well known per se, and the circuit 438 is one such circuit.

We will now consider the mode of operation of the system in writing information received from the host computer into the various formatters. When a write operation is undertaken, data is received by the FIFO 350, and is transferred along buses 444 and 446 to the transceiver 430 to the bus 428, around the loop including the buffer 448 and up along the bus 420. Simultaneously, the input data is routed through the parity generation circuit 438, with the output stored briefly in the register 440. At the proper point in time, when the information for the parity formatter and drive is due, on a sequential basis, the register 440 provides information on bus 428 which is coupled through the isolation buffer 448 to bus 420. Incidentally, data is routed sequentially to the formatters through 4 which store the data, and then the fifth formatter is supplied with the data from register 440. Now, considering how the data is transferred from the bus 420 to each of the formatters, successive bytes of data are received by the register 452 associated with the first formatter, and with the other input registers 454 corresponding to the register 452 for each of the other circuits After having been received by the input registers 452 and the remaining input registers 454 sequentially, the data is transferred to the "pipeline" registers 456, and is then transferred to all of the transceivers 394, 398, 400, 402 and 410 simultaneously, and thus to the formatters. As discussed hereinabove, the hand-shake circuitry 378 comes into play, as before, upon the transfer of each byte of data.

As mentioned above, when a drive fails, it may be powered down, and a new drive and formatter substituted into the system, replacing the failed drive. Under these circumstances, it is desirable to restore the data which would have been stored in the failed drive had it not been malfunctioning. We will now describe how this restoring operation is accomplished.

In the "Restore" mode, assuming that the third data drive has malfunctioned and has been replaced, the steps in restoring the data would be as follows: First, the data from the first, second, fourth, and the parity drives is brought in through the transceivers. This would be through the transceivers 394, 398, 402 and 410, and the data would be stored in the registers 412, 414, 418 and 436, with the transceiver and registers associated with the third drive being omitted. This data would be routed along bus 420 into the staging registers 424, and a parity sum would be concurrently accomplished by the circuit 438, with the results stored in register 440. The results of this parity sum would then be routed back up the bus 420 to the input register 454, associated with the third formatter, through the third pipeline register 456, and through the transceiver 400 to the connector 316, and ultimately to the third formatter and drive. In this way, the restore function is accomplished, byte-by-byte until the newly substituted drive has all of the missing data.

Now, turning to FIG. 8A, the circuitry associated with the master controller CPU 326 will be discussed. Specifically, the address latch 462 and the data buffer 464 separate the address information from the data information from the master controller CPU. The main program for the entire master controller is stored in the Programmable, Read-Only Memory, or PROM 466, and transient memory capacity is supplied by the random access memories or RAMS 468 and 470. The read buffers 472, 474 and the remaining buffers 476 as shown in FIG. 8A, at the right-hand side thereof, are all inputs which are sampled by the master controller CPU 326. Incidentally, the inputs 478 and 480 which are each designated with a small diamond, are all from the formatters.

FIG. 8B shows all of the outputs from the master controller CPU. The registers 482 which appear at the left-hand side of FIG. 8B are the configuration outputs from the master controller CPU, and would direct the data path circuitry as set forth in FIGS. 7A through 7F to perform the various operations discussed hereinabove, such as Restore, Read, Write, and the like. It may be noted that the output register 484 has as one of its inputs the Power-On Reset lead 486. As some of the outputs from the register 484 are those leading to the individual formatters, indicated by the reference numeral 488, these output leads are specially powered by the open collector drivers 490 which provide sufficient power to drive the "On-Off" relays in the individual formatters. The remaining registers shown in FIG. 8B are further output registers operated under the control of the master controller CPU 326.

Figure 9:
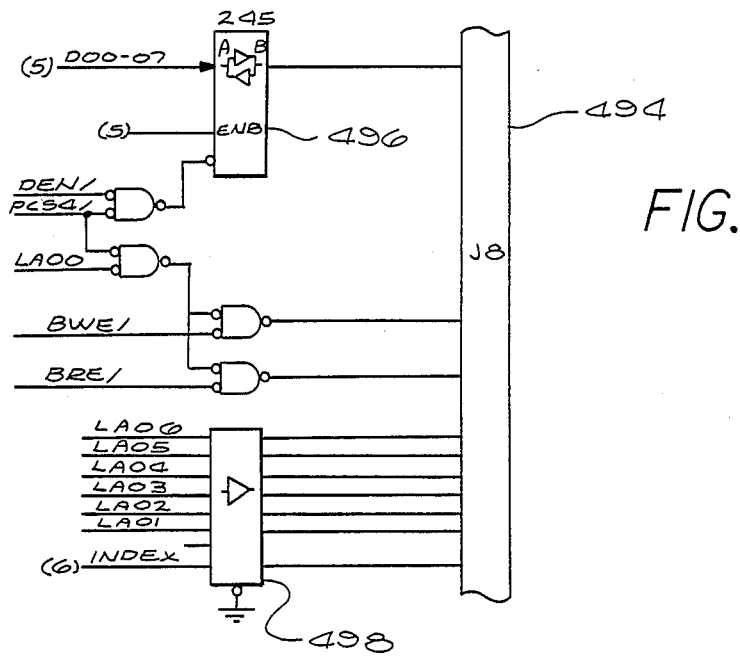
FIGS. 9, 10 and 11 constitute additional circuitry forming part of the master controller.

FIG. 9 illustrates the circuitry interconnecting the master controller CPU to the connector 494 leading to the front panel circuit board. It includes the transceiver 496 for the data bus, and the driver 498 for the address bus and the spindle synchronization signal labeled "Index". The additional logic included in FIG. 9 controls the direction of operation of the transceiver 496 and supplies the Read and Write signals.

Figure 10:
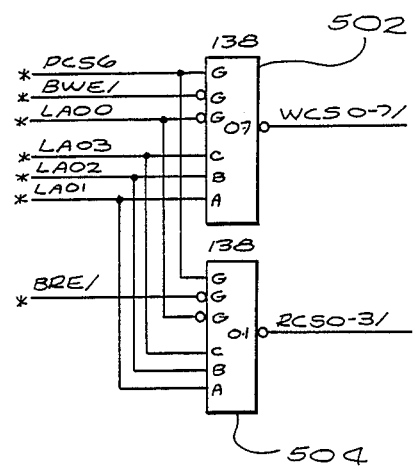

Turning now to FIG. 10, this simple circuit merely shows two decoder circuits 502 and 504 which decode the address lines and the block select signals from the master controller CPU and provides write chip selection signals and read chip selection signals as a result of the inputs from the CPU.

Figure 11:
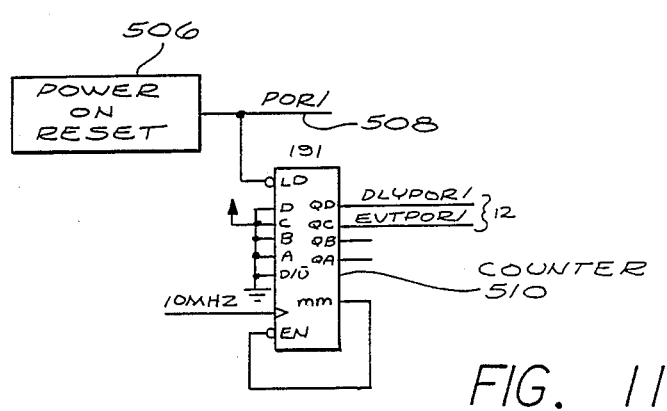

FIG. 11 shows the "Power-on Reset" circuit 506 which senses the state of the input power supplies, and provides a power-on reset signal on lead 508, once the power supplies have been on for a period of time sufficient for them to stabilize. The counter 510 is employed to generate a special reset pulse required for the timing control circuitry.

Figure 13:
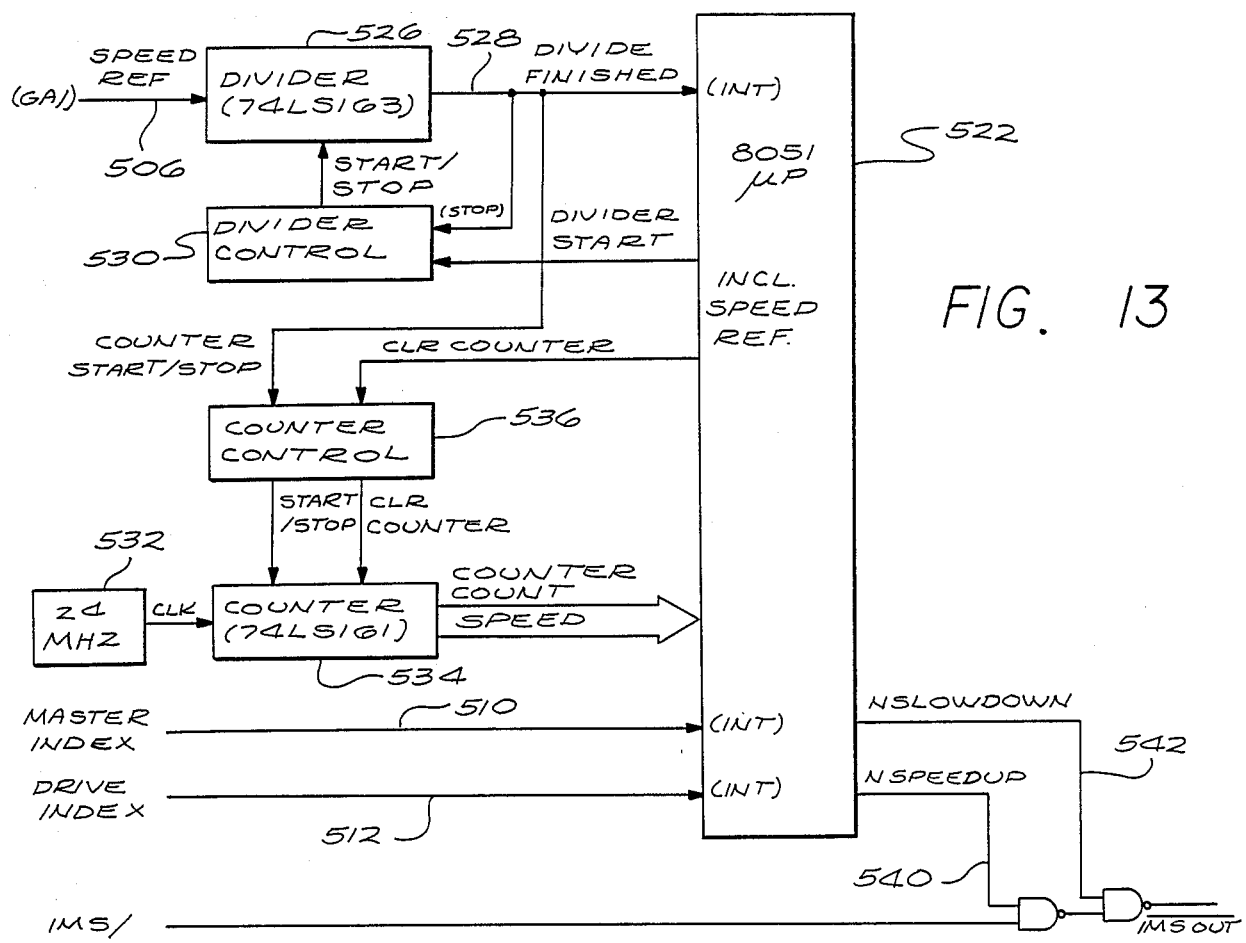
FIG. 13 is a block circuit diagram showing the mode of operation of the spindle synchronization circuitry.

The synchronization of the spindles of all five drives will now be considered in connection with FIGS. 12 and 13 of the drawings. FIG. 12 is a functional block diagram of the system, and FIG. 13 is a circuit diagram showing how the system is implemented in practice.

Referring first to FIG. 12 of the drawings, (which is on Sheet 1 of the drawings with FIG. 1), the spindle motor is shown at reference numeral 502, and the spindle motor servo circuit is shown at reference numeral 504. From the servo disk of the drive motor, a velocity feedback signal is supplied on lead 506 in terms of a closely spaced series of pulses. A position reference signal is provided by the circuit 508 on lead 510. To give an indication of the nature of the signals which are involved, and their timing, the drive spindle motors normally rotate at 3600 revolutions per minute. This means that one rotation will occur every 16.667 milliseconds or once every 16,667 microseconds. The index pulse from the position reference circuit 508 is approximately 2 microseconds in length, and is in the form of a negative going pulse of this length, at this repetition rate. From the drive itself, on lead 512 is a position feedback indication or drive index, which is approximately 1.5 microseconds in length, and which occurs approximately once every 16,667 microseconds, at an interval substantially corresponding to that of the master index, but which is of course dependent on the actual speed and orientation of the disks of the disk drive.

When the five drives are initially powered up, they would not normally be synchronized in their angular orientation. The purpose of the synchronization circuits to be discussed hereinbelow is to synchronize all five drives so that they rotate with their angular orientations substantially synchronized as they rotate. With the circuitry holding the drive index to within plus or minus 20 or 30 microseconds of the reference index pulse, and with one rotation of the drives taking approximately 16,667 microseconds, the drives are oriented relative to one another very closely, to less than one or two degrees of orientation.

Now, returning to FIG. 12, the drive index pulse on lead 512 is compared to the position reference master index pulse on lead 510, in the circuit 514. Circuit 514 determines whether the drive index is leading or lagging the position reference master index, and changes the speed reference, as indicated by the block 516, increasing or decreasing the speed reference, so as to cause a speed-up or a reduction in speed of the spindle motor, as a result of the information in the circuit 518.

The functional diagram of FIG. 12 shows schematically how the control is accomplished. Reference will now be made to FIG. 13 on one of the last sheets of the drawings, to show how the circuit is implemented in the present system. With reference to FIG. 13, it includes the microprocessor 522, the master index signal on lead 510 from the master controller, and the drive index signal on lead 512 from the drive. In addition, the signal on lead 506 designated GA is shown in FIG. 13. The circuit shown in some detail to the left of the microprocessor 522 serves to provide a calculation for measurement of the actual speed of the drive. This is accomplished by applying the closely spaced pulses designated GA on lead 506 to the divider 526 and measuring the time required for the divider 526 to count up to 128, at which time a pulse is provided on lead 528 back to the microprocessor 522. This is accomplished about twenty times for each revolution of the drives. The foregoing is accomplished under the control of the divider control circuit 530. A standard 24 megahertz clock 532 supplies pulses to the counter 534 for the interval required for the divider 526 to count up to the predetermined number of impulses, in this case, 128, under the control of the counter control 536. The resultant number from counter 534 indicates the speed of the drive. Independently stored within the microprocessor 522 in a register, for example, is a number representing the desired speed of the drive, corresponding to the number which would be produced by counter 534 if the drive were operating at the exactly correct speed. If the count received from the counter 534 is greater than the reference speed stored in the speed register in microprocessor 522, then the drive motor is going too slow, and a signal is applied on lead 540 to speed up the motor. On the other hand, if the count from the counter 534 is less than the number stored in the speed reference register in microprocessor 522, then a signal will be applied to output lead 542 to slow down the drive motor. In the event that the two numbers are the same, the previous state of signals applied to leads 540 and 542 is reversed, so that the speed will dither, or slightly alternate, about the desired true value. Incidentally, the sampling rate is approximately 20 times per revolution of the motor, so that the short duration signals applied to leads 540 and 542 during successive sampling intervals have relatively small effect on the motor speed, unless they are maintained in the same polarity for a substantial period of time.

Now, the effect of the comparison of the position of the master index and the drive index signals will be considered. Essentially, what is done is to change the value of the speed reference number stored in the microprocessor depending on whether the relative positions of the master reference index and the drive index are such that the motor is to be speeded up or slowed down. More specifically, when the system is initially powered up and the drive index and the master index are normally spaced apart by a substantial angular distance, such as more than 1.0 milliseconds (out of the 16.667 milliseconds for a complete rotation), then the reference number stored in the microprocessor is shifted so that the motor speed is changed to plus or minus 0.45 percent of nominal speed. The drive motor is maintained at this speed until the drive index position is within plus or minus 1.0 milliseconds in the master index.

When the drive index is within plus or minus 1.0 milliseconds but outside plus or minus 200 microseconds of the position of the master index, the drive motor speed is changed to plus or minus 0.1 percent of nominal speed. The drive motor is maintained at this speed until the drive index position is within plus or minus 200 microseconds of the reference index signal. When the index gap is within 200 microseconds, then the object is to further reduce the index gap until it is less than 30 microseconds. Once this low gap is attained, the amount of change of the reference number, and the rapidity at which it is changed is limited. Thus, within this plus or minus 30 microsecond spacing, the reference number is only changed by one unit from the previous number, and this change is only made once every two revolutions of the spindle, or every two occurrences of the drive index pulse. Now, as the pulses approach more closely, and are within the thirty microsecond spacing, the time intervals for changes may be further restricted.

Referring now to FIG. 14 of the drawings, the system "Fail Safe Operation" is described. The successive steps start with the oval 602 indicating the start of a read operation. The block 604 indicates the step of reading the data from all of the disk drives into the controller or formatter buffers. The diamond 606 inquires if there are any errors. A "yes" answer brings us to diamond 608 which inquires as to whether there is more than one disk error. A "yes" answer brings us to block 610 indicating a "re-try" to see if the errors were merely transient errors. Diamond 612 inquires as to whether there is still any error. A "yes" answer will bring us to the inquiry as to whether there is more than one disk error, as presented in diamond 614. A "yes" indicates a probable problem area and the block 616 indicates that the data will be handled according to system options, perhaps correcting the data in other manners or performing diagnostic functions to determine the nature of the malfunction.

Returning to a "no" answer from the diamond 608, which inquired as to whether there was more than one disk error, the block 618 indicates the generation of good data to replace bad data from the error disk by reading three good data disks and the parity disk drive. The steps involved in this procedure have been reviewed in some detail in connection with the master controller circuitry. The next step as indicated by the block 620 is to transmit the good data to the host computer or data processor. Referring now to the "no"

possibility from diamonds 612, this leads directly to block 620 involving passing good data to the host. Similarly, a "no" answer from diamond 614, indicating that there was only one disk error, leads to data reconstruction as indicated by block 618 and then passing the good data on to the host. Oval 622 indicates the end of the program sequence.

Figure 15:
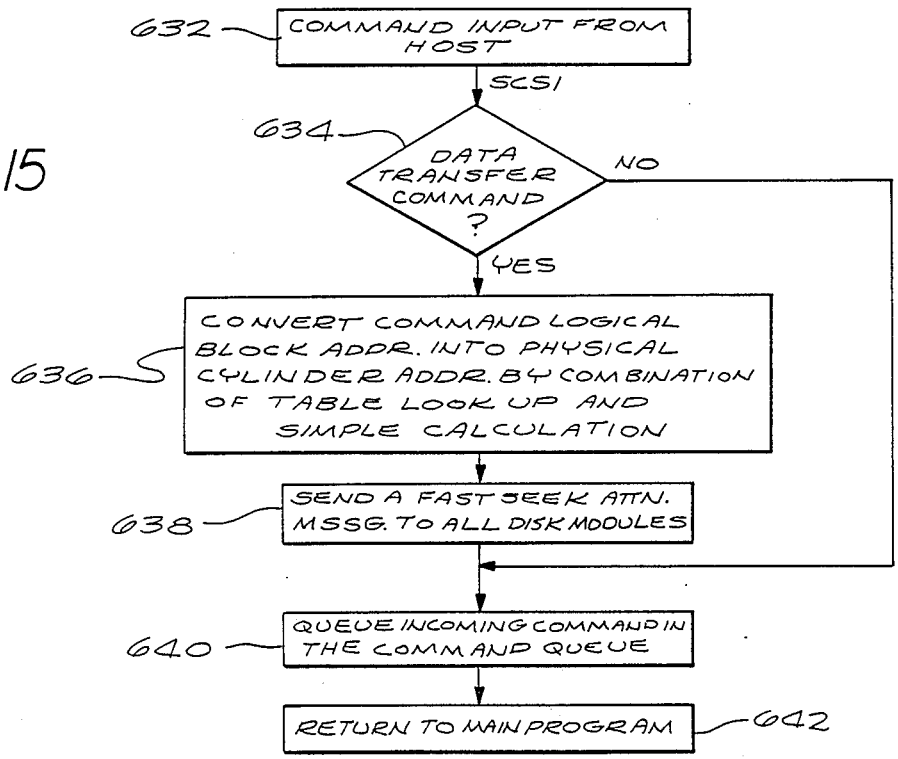
FIG. 15 is a program diagram showing the "fast seek" technique for speeding up the transfer of data between the host computer and the storage system of the present invention.

FIG. 15 shows the steps of the "fast seek" program. This program would be stored in the PROM 466 associated with the master controller CPU 326. Referring back to FIG. 15, the initial block 632 indicates the receipt of a command input to the master controller from the host computer or data processor. The diamond 634 inquires as to whether the command is a data transfer command or not. As discussed hereinabove, the commands from the host computer to the master controller are in the form of SCSI commands, which normally have a block of 6 or 10 bytes, each including 8 bits of information. Normally, the second byte of information to be transmitted will include an indication as to whether the command is a data transfer command, and an identification of the location on the drive disks to which the command relates. If the answer to the inquiry of diamond 634 is "yes", then the command is converted into physical cylinder addresses for the drives, as indicated by block 636. Block 638 indicates the step of sending a fast seek "attention" message to all disk formatters, so that the head positioners associated with each drive have the opportunity to shift the heads to the proper angular location across the disks, preparatory to receipt of the final command. The next step is to queue incoming commands in the command queue within the master controller, as indicated by the block 640. It would be expected that the data transfer command would be forthcoming, and with the heads within the drives already being located in the proper position, a significant amount of time is saved by the fast seek procedure as developed in FIG. 15. A "no" answer to the inquiry of diamond 634 also brings us to the block 640, as no head positioning is involved. The final step of returning to the main program is indicated by block 642.

In conclusion, it is to be understood that the foregoing detailed description and accompanying drawings relate to one illustrative implementation of the invention. The invention is not limited to this one illustrative implementation; thus, by way of example and not of limitation, a system using ten drives with two parity drives could be used, with the resultant higher data rate with respect to the host computer. Also, other parity check schemes, using even or odd parity, and forming parity checks over various combinations of bits from the data drives, could be used. Further, different logic circuit arrangements, and different mechanical configurations may be provided, for accomplishing substantially the same results as are disclosed herein. Accordingly, the present invention is not limited to the system as described in detail herein and as shown in the accompanying drawings.

APPENDIX NO. I

The information in the attached table forming Appendix No. I is set forth in a series of columns. The first column is the broad "Error Code" which is employed in reporting the error or malfunction back to the host computer over the SCSI bus. The Error Code number also appears on the LCD display in many cases. The second "Sense Key" column is a more detailed definition of the nature of the error, and is also reported back to the host computer over the SCSI bus. The next information provided by the table is the state of the light-emitting diodes designated "Power", "On-Line", "Ready" and "Fault". The binary designation "T" (for "True") indicates that the LED is on; the letter "F" (for "False") indicates that the LED is off; and the designation "B" indicates that the LED is blinking or flashing. The central portion of the table is self-explanatory, and the message which appears on the liquid crystal display appears to the right in the table, and of course, would include the drive or channel number where the designation "Ch#" appears.

APPENDIX NO. I
ON-LINE ERROR REPORTING

| ERROR CODE | SENSE KEY | LEDS | | | | DESCRIPTION | LCD MESSAGE |
| | | PWR | ONL | RDY | FLT | | |
| --- | --- | --- | --- | --- | --- | --- | --- |
| 00 | 00 | T | T | T | F | Command completed successfully. | System running |
| 01 | 04 | T | T | B | B | No index or sector signal is found<br>Error channel will be powered down | Ch:# Er:01<br>Replace Ch:# |
| 03 | 04 | T | T | B | B | Write fault detected at data channel<br>Error channel will be powered down | Ch:# Er:03<br>Replace Ch:# |
| 04 | 04 | T | T | B | B | Channel not ready<br>Error channel will be powered down | Ch:# Er:04<br>Replace Ch:# |
| 10 | 03 | T | T | T | F | Channel ID field CRC error | System running |
| 11 | 03 | T | T | T | F | Unrecovered read data ECC error | System running |
| 12 | 03 | T | T | T | F | ID field sync byte error | System running |
| 13 | 03 | T | T | T | F | Data field sync byte error | System running |
| 14 | 03 | T | T | T | F | No record found | System running |
| 15 | 03 | T | T | B | B | Seek positioning error<br>Error channel will be powered down | Ch:# Er:15<br>Replace Ch:# |
| 17 | 01 | T | T | T | F | Recovered read data with retries (without ECC) | System running |
| 18 | 01 | T | T | T | F | Recovered read data with ECC (with retries) | System running |
| 19 | 03 | T | T | T | F | Error in accessing one of the defect lists | System running |
| 1B | 04 | T | T | F | T | Synchronous transfer error<br>All channels will be powered down | Master Er:1B<br>System Fault |
| 1C | 03 | T | T | T | F | Primary defect list not found | System running |
| 1D | 0E | T | T | T | F | Compare error | System running |
| 20 | 05 | T | T | T | F | Invalid command operation code | System running |
| 21 | 05 | T | T | T | F | Illegal logical block address | System running |

APPENDIX NO. I
ON-LINE ERROR REPORTING

| ERROR CODE | SENSE KEY | LEDS PWR | ONL | RDY | FLT | DESCRIPTION | LCD MESSAGE |
|---|---|---|---|---|---|---|---|
| 24 | 05 | T | T | T | F | Illegal field in CDB | System running |
| 25 | 05 | T | T | T | F | Invalid LUN (Logical Unit No.) | System running |
| 26 | 05 | T | T | T | F | Invalid field in parameter list | System running |
| 27 | 07 | T | T | T | F | Write Protect | System running |
| 29 | 06 | T | T | T | F | Power on, Reset, or Bus device reset | System running |
| 2A | 06 | T | T | T | F | Mode select parameters changed | System running |
| 32 | 03 | T | T | T | F | No defect spare location available | System running |
| 43 | 04 | T | T | T | F | Message reject error | System running |
| 45 | 04 | T | T | T | F | Select/Reselect failed | System running |
| 47 | 04 | T | T | T | F | SCSI interface parity error | System running |
| 48 | 04 | T | T | T | F | Initiator detected error | System running |
| 49 | 04 | T | T | T | F | Inappropriate/Illegal message | System running |
| 50 | 04 | T | T | B | B | Channel uP eprom test failure<br>Error channel will be powered down | Ch:# Er:50<br>Replace Ch:# |
| 51 | 04 | T | T | B | B | Channel uP ram test failure<br>Error channel will be powered down | Ch:# Er:51<br>Replace Ch:# |
| 52 | 04 | T | T | B | B | Channel external ram test failure<br>Error channel will be powered down | Ch:# Er:52<br>Replace Ch:# |
| 53 | 04 | T | T | B | B | Channel formatter test failure<br>Error channel will be powered down | Ch:# Er:53<br>Replace Ch:# |
| 54 | 04 | T | T | B | B | Channel buffer manager test failure<br>Error channel will be powered down | Ch:# Er:54<br>Replace Ch:# |
| 55 | 04 | T | T | B | B | Channel track buffer test error<br>Error channel will be powered down | Ch:# Er:55<br>Replace Ch:# |
| 56 | 04 | T | T | B | B | Master interrupt latch not cleared<br>Error channel will be powered down | Ch:# Er:56<br>Replace Ch:# |
| 57 | 04 | T | T | T | F | Index sync error | Ch:# Er:57<br>System Warning |
| 58 | 04 | T | T | B | B | Parity error detected at formatter<br>Error channel will be powered down | CH:# Er:58<br>Replace Ch:# |
| 59 | 04 | T | T | B | B | Parity error detected at bufer manager<br>Error channel will be powered down | Ch:# Er:59<br>Replace Ch:# |
| 5A | 04 | T | T | B | B | Parity error detected in ESDI status<br>Error channel will be powered down | Ch:# Er:5A<br>Replace Ch:# |
| 5B | 04 | T | T | B | B | Channel not installed | Ch:# Er:5B<br>Install Ch:# |
| 60 | 04 | T | T | B | B | Drive fault attention from the drive<br>Error channel will be powered down | Ch:# Er:60 .<br>Replace Ch:# |
| 61 | 04 | T | T | B | B | Invalid ESDI command received at drive<br>Error channel will be powered down | Ch:# Er:61<br>Replace Ch:# |
| 62 | 04 | T | T | B | B | Interface fault detected at drive<br>Error channel will be powered down | Ch:# Er:62<br>Replace Ch:# |
| 63 | 04 | T | T | B | B | Parity error detected in ESDI command<br>Error channel will be powered down | Ch:# Er:63<br>Replace Ch:# |
| 64 | 04 | T | T | B | B | Drive at Reset<br>Error channel will be powered down | Ch:# Er:64<br>Replace Ch:# |
| 65 | 04 | T | T | B | B | Spindle motor is not turning<br>Error channel will be powered down | Ch:# Er:65<br>Replace Ch:# |
| 66 | 04 | T | T | B | B | Disk read/write test error<br>Error channel will be powered down | Ch:# Er:66<br>Replace Ch:# |
| 67 | 04 | T | T | B | B | ESDI command complete timeout error<br>Error channel will be powered down | Ch:# Er:67<br>Replace Ch:# |
| 68 | 03 | T | T | B | B | Channel signature not matched<br>Error channel will be powered down | Ch:# Er:68<br>Replace Ch:# |
| 69 | 04 | T | T | B | B | ESDI command (REQ/ACK) timeout error<br>Error channel will be powered down | Ch:# Er:69<br>Replace Ch:# |
| 6A | 01 | T | T | T | F | Recovered seek error | System running |
| 70 | 04 | T | T | F | T | Master controller missed SBIC power-up interrupt | Master Er:70<br>System fault |
| 71 | 04 | T | T | F | T | Master controller ram test failure | Master Er:71<br>System fault |
| 72 | 04 | T | T | F | T | Master controller fifo test failure | Master Er:72<br>System fault |
| 73 | 04 | T | T | F | T | Master controller SBIC register test failure | Master Er:73<br>System fault |
| 74 | 04 | T | T | B | B | Channel sector pulse signal error<br>Error channel will be powered down | Ch:# Er:74<br>Replace Ch:# |
| 75 | 04 | T | T | B | B | Channel busy signal error<br>Error channel will be powered down | Ch.# Er:75<br>Replace Ch:# |
| 76 | 04 | T | T | B | B | Channel command/attention parity error<br>Error channel will be powered down | Ch:# Er:76<br>Replace Ch:# |
| 77 | 04 | T | T | B | B | Channel ACK signal error<br>Error channel will be powered down | Ch:# Er:77<br>Replace Ch:# |
| 80 | 09 | T | T | T | F | Undefined channel command error | System running |
| 81 | 09 | T | T | T | F | Track buffer address overflow error | System running |
| 82 | 09 | T | T | T | F | Incomplete channel command error | System running |
| 83 | 09 | T | T | T | F | Channel microprocessor execution error | System running |

APPENDIX NO. I
ON-LINE ERROR REPORTING -continued

| ERROR CODE | SENSE KEY | LEDS | | | | DESCRIPTION | LCD MESSAGE |
|---|---|---|---|---|---|---|---|
| | | PWR | ONL | RDY | FLT | | |
| 84 | 09 | T | T | T | F | Seek beyond maximum cylinder | System running |
| 85 | 09 | T | T | T | F | Abort command (command not completed) | System running |
| 86 | 09 | T | T | T | F | Reassign not completed at power-up | System running |
| 87 | 09 | T | T | T | F | Maintenance track write error | System running |
| 88 | 09 | T | T | T | F | Maintenance track read error | System running |
| 89 | 03 | T | T | T | F | Data field ecc error | System running |
| 8A | 03 | T | T | T | F | Diagnostic track format error | System running |

Notes:
PWR - Power On
ONL - System On Line
RDY - System Ready
FLT - System Fault
B - LED is Blinking
F - LED is OFF
T - LED is ON

APPENDIX NO. II

The second Appendix relates to diagnostics which are entered into the system from the front panel when the system is off-line and in the diagnostic mode, as set forth in the specification. Selected diagnostic programs are listed below with their associated code number, which is entered on the system numerical keyboard.

A. Support Functions

These support functions enable the user to accomplish a number of miscellaneous actions.

00 SET ID

Select SCSI bus target ID number. Displays the current target ID number and accepts entry of a new number. Sets the new ID and the ID valid bit in the ID byte if an entry is made.

Line 1: CUR ID=x
Line 2: NEW ID=_

01 TEST LED

Light all the front panel LEDs, including write protect. The LEDs will all light when the function is entered and will stay lit until ENTER is pressed again to return to normal status.

02 CLEAR LED

Clear all the system status LEDs except "Power". The LEDs will be turned off when the function is entered and will stay off until ENTER is pressed again. On return to normal status, only the "Power and "Maintenance" LEDs will be lit. The status LEDs are not cleared on entering maintenance mode or on completion of the test functions.

03 TEST KEY

Echo keypad entries on the LCD. Number keys will display the corresponding number, ENTER will display "E", ON LINE/DIAGNOSTIC will display "0", RESTORE will display "R", WRITE PROTECT will display "W" and RESTART will exit the test and return to the function code prompt.

04 DISPLAY STATUS

Show most recent command completion status for the selected channel, where 0 is channel A, 1 is B, 2 is C, 3 is D, and 4 is parity. Status is displayed in the form: CH: xx ER: yy, where 'yy' is the error sense code that would be returned on the SCSI bus. When ENTER is pressed, the LCD will return to the function prompt.

Line 2: CHAN=_

B. Master Controller Functions

The master controller functions are intended to check the operational status of the major components of the controller through direct testing of the hardware. The FIFO and SBIC tests call existing test procedures from the master controller selftest routines. The RAM and microprocessor tests are additional routines developed for the diagnostics that are not part of the master controller selftest.

10 MICRO microprocessor.

Test registers and internal functions of 80186 If an error is detected, the message 'MICRO ERROR: n' will be displayed, where n is the error code. An error code of 0 indicates flags failure, 1 indicates register failure, 2 indicates addressing mode failure and 3 indicates arithmetic operation failure. The message will be displayed until ENTER is pressed.

11 RAM

Test 2 K×16 RAM using all eight data patterns. This is a nondestructive test to check all RAM addresses. If an error is detected, the message 'RAM ERROR: hhhh' will be displayed, where hhhh is the address in hex of the failed byte. The message will be displayed until the user presses ENTER or RESTART. If ENTER is pressed, the test will continue with the next memory location. If RESTART is pressed, the diagnostics will return to the function prompt.

12 FIFO

Test FIFO memory and control loqic. Verifies that a data pattern can be written to and read from the FIFO correctly. If an error condition is detected, the message 'Master Er: 72' will be displayed. The message will be displayed until ENTER is pressed.

13 SBIC

Test Western Digital SBIC chip. Verifies that the SBIC chip control registers can be set and read correctly. If an error condition is detected, the message 'Master Er: 73' will be displayed. The message will be displayed until ENTER is pressed.

C. Channel Controller Functions.

These tests are intended to verify the operation of the master controller to channel controller interface and check the data path to the channels. If an error condition is detected during any of the channel controller tests, the message 'Ch: x Er: y' will be displayed, where x is the channel in which the error was detected and y is the SCSI error code. Pressing ENTER will continue checking status of the remaining channels for error conditions before returning to the function prompt. Pressing RESTART will return directly to the function prompt.

20 SELFTEST

Perform internal channel controller selftest. This function tests channel controller internal components checked by the self test routine.

21 RESET

Reset the channel controllers and drives. This function is for initializing the channel controllers and drives to a known state.

22 REZERO

Reposition drives to cylinder zero. This function checks that the positioner can find cylinder 0.

23 SEEK

Seeks to the innermost data cylinder.

24 VERIFY

Verifies the data written at the innermost data cylinder by making an ECC check. No data pattern compare is made. Verify must be called after Seek. This function also verifies the success of the seek.

25 WRITE BFR

Write data pattern to channel buffer. This function is intended to test the command execution, not the entire buffer memory and will write the data pattern to a limited area.

26 READ BFR

Read data pattern from channel buffer. This function will also read a limited pattern.

What is claimed is:

1. A parallel array Winchester disk drive storage system comprising:
   at least three substantially standard hard disk drive storage units;
   means for mounting said disk drive units side-by-side;
   master controller means for controlling the operation of said disk drives to store digital data in said drives and to route data and instructions between a host computer and said disk drives;
   means for storing data in more than one-half of said drives, and means for storing parity check data relating to the data stored in said drives in at least one of the other of said drives;
   means for regenerating erroneous or missing data from any one of said drives from the parity check drive data, and/or data from the other drives in said group, in an on-line basis;
   means for identifying a malfunctioning one of said drives;
   means for powering down said malfunctioning drive;
   means for removing any single drive unit from said system and substituting a different drive unit into said system while the system remains on line;
   means for storing digital information onto the new drive which is substituted for the malfunctioning drive, using said regenerated data; and
   said controlling means including means for storing data on said drives in terms of successive bytes or groups of bits from the host computer being successively applied to successive ones of said drives.

2. A storage system as defined in claim 1 wherein drive formatter means are provided for coupling said master controller means to each of said drives.

3. A storage system as defined in claim 2 wherein said storage system includes a housing, and wherein each disk drive and associated formatter unit is mounted on means for guiding the drive and formatter into said housing, and mating connector means are provided on said housing and on each said drive and associated formatter, to automatically connect and disconnect each said drive and formatter into the system as they are guided into and removed from said housing, respectively.

4. A storage system as defined in claim 1 wherein said controlling means stores data on said drives in terms of successive bytes of information of eight bits each, being supplied to successive drives.

5. A storage system as defined in claim 1 wherein a control and signalling panel is provided, including signal light means for indicating the status of the system, control switches for controlling the mode of operation of the system, alphanumeric display means for providing diagnostic information, and a keyboard for applying control signals to the system.

6. A storage system ad defined in claim 5 wherein a removable cover for the front of the system is provided, and means are provided for permitting viewing of the signal lights when the cover is in place covering the front of the drives and the control and signalling panel.

7. A storage system as defined in claim 5 wherein means are provided for mounting said panel in front of at least one of said drives, and means are provided for shifting said panel away from the front of any of said drives while maintaining said panel operatively coupled to said system, to permit removal and replacement of said drives.

8. A storage system as defined in claim 1 wherein said system includes five drives, of which four are included in said group of drives and wherein there is one parity drive.

9. A storage system as defined in claim 1 as defined in claim 1 further comprising means for synchronizing the angular rotation of all of said drives from a signal supplied by said master controller means.

10. A storage system as defined in claim 1 wherein said system includes a housing having a height of approximately seven inches and a transverse width of approximately seventeen inches to fit in standard nineteen inch spacing racks, and wherein said standard disk drives are removably mounted, side-by-side with the axes of the disk drives being generally horizontal, within said housing.

11. A storage system as defined in claim 1 wherein said system includes means for transferring data in parallel to the multiple drives, thereby increasing the data rate of the system.

12. A storage system as defined in claim 1 including means for providing SCSI commands to the master controller means from the host data processor, and means for initially processing partial SCSI commands relating to data transfer, and relaying head positioning instructions to the drives, to speed up system response.

13. A method for storing data in a storage system including a plurality of at least three substantially standard Winchester type disk drives, and a master controller for coupling a host data processor to said disk drives, including the steps of:
   transferring data between said host computer and said drives with successive groups of successive bits of data from said host computer being transferred to a group of said drives including more than one-half of said drives;
   storing parity check digital information in at least one additional drive not included in said group;
   determining that a malfunction exists in one of said group drives;
   regenerating data applied to said malfunctioning drive, using the parity check digital information and/or the data stored in the remaining drives of said group;

supplying the regenerated data to the host computer with the valid data from other drives of said group;

physically removing the malfunctioning drive from the system and replacing it with a new, functioning drive, while the system is kept on line; and supplying regenerated digital information to the new functioning drive to restore lost digital information.

14. A method as defined in claim 13 wherein the supplying of regenerated digital information to the new drive is accomplished while the system is on-line, between requests from the host data processor for data transfer.

15. A method as defined in claim 13 wherein commands from the host data processor to the storage system are in a lengthy digital command format, with data transfer information, if any, being included in an early portion of such commands, the method including the steps of decoding the data transfer portion of commands as they received by the storage system, and initiating shifting of the magnetic head position of the drives to the indicated position before the complete command had been processed, to speed up the response of the system.

16. A method as defined in claim 13 including the additional step of synchronizing the angular rotation of each of the drives from index signals supplied by the master controller.

17. A parallel array Winchester disk drive storage system comprising:

at least three substantially standard Winchester type disk drive storage units;

means for mounting said disk drive units adjacent one-another;

master controller means for controlling the operation of said disk drives to store digital data in said drives and to route data and instructions between a host computer and said disk drives;

means for storing data in a group of more than one-half of said drives, and means for storing parity check data relating to the data stored in said group of drives in at least one of said drives not included in said group drives;

means for regenerating erroneous or missing data from any one of said group of driven from the parity check drive data, and data from the other drives in said group;

said controlling means including means for storing data on said drives in terms of successive bytes or groups of bits from the host computer being successively applied to successive ones of said group of drives; and means for synchronizing the angular rotation of all of said drives from a signal supplied by said master controller means.

18. A storage system as defined in claim 17 wherein said controlling means stores data on said drives in terms of successive bytes of information of eight bits each, being supplied to successive drives in said group of drives.

19. A storage system as defined in claim 17 wherein a control and signalling panel is provided, including signal light means for indicating the status of the system, control switches for controlling the mode of operation of the system, alphanumeric display means for providing diagnostic information, and a keyboard for applying control signals to the system.

20. A storage system as defined in claim 19 wherein means are provided for mounting said panel in front of at least one of said drives, and means are provided for shifting said panel away from the front of any of said drives while maintaining said panel operatively coupled to said system, to permit removal and replacement of said drives.

21. A storage system as defined in claim 17 wherein said system includes five drives, of which four re included in said group of drives and wherein there is one parity drive.

22. A storage system as defined in claim 17 including means for providing commands to the master controller means from the host data processor, said commands having a lengthy format including data transfer information, if any, in an early portion of said command, and means for initially processing the portion of the commands relating to data transfer, and relaying head positioning instructions to the drives, to speed up system response.

23. A parallel array Winchester disk drive storage system comprising:

at least three Winchester type disk drive units;

means for mounting said disk drive units adjacent one-another;

master controller means for controlling the operation of said disk drives to store digital data in said drives and to route data and instructions between a host computer and said disk drives;

means for storing data in a group of more than one-half of said drives, and means for storing parity check data relating to the data stored in said group of drives in at least one of said drives not included in said group of drives;

means for regenerating erroneous or missing data from any one of said group of drives from the parity check drive data, and data from the other drives in said group;

said controlling means including means for storing data on said drives in terms of successive bytes or groups of bits from the host computer being successively applied to successive ones of said group of drives; and means for providing commands to the master controller means from the host data processor, said commands having a lengthy format including data transfer information, if any, in an early portion of said command, and means for initially processing the portion of the commands relating to data transfer, and relaying head positioning instructions to the drives, to speed up system response.

24. A parallel array Winchester disk drive storage system comprising:

at least three Winchester type disk drive units;

means for mounting said disk drive units adjacent one-another;

master controller means for controlling the operation of said disk drives to store digital data in said drives and to route data and instructing between a host computer and said disk drives;

means for storing data in a group of more than one-half of said drives, and means for storing parity check data relating to the data stored in said group of drives in at least one of said drives not included in said group of drives;

means for regenerating erroneous or missing data from any one of said group of drives from the parity check drive data, and data from the other drives in said group;

said controlling means including means for storing data on said drives in terms of successive bytes or groups of bits from the host computer being successively applied to successive ones of said group of drives;

said system including drive formatter means for coupling said master controller means to each of said drives; and said system including a housing, and each disk drive and associated formatter unit being mounted on means for guiding the drive and formatter into said housing, and mating connector means on said housing and on each drive and associated formatter, to automatically connect and disconnect each said drive and formatter into the system as they are guided into and removed from said housing, respectively.

25. A system as defined in claim 24 including means for replacing any single drive in said system while the system remains on line.

26. A storage system as defined in claim 24 wherein a control and signalling panel is provided, including signal light means for indicating the status of the system, control switches for controlling the mode of operation of the system, alphanumeric display means for providing diagnostic information, and a keyboard for applying control signals to the system.

27. A storage system as defined in claim 26 wherein means are provided for mounting said panel in front of at least one of said drives, and means are provided for shifting said panel away from the front of any of said drives while maintaining said panel operatively coupled to said system, to permit removal and replacement of said drives.

28. A storage system as defined in claim 24 wherein said system includes five drives, of which four are included in said group of drives and wherein there is one parity drive.

29. A storage system as defined in claim 24 as defined in claim 1 further comprising means for synchronizing the angular rotation of all of said drives from a signal supplied by said master controller means.

30. A storage system as claimed in claim 24 including means for providing commands to the master controller means from the host data processor, said commands having a lengthy format including data transfer information, if any, in an early portion of said command, and means for initially processing the portion of the commands relating to data transfer, and relaying head positioning instructions to the drives, to speed up system response.

31. A parallel array Winchester disk drive storage system comprising:

at least three substantially standard Winchester type disk drive storage units;

means for mounting said disk drive units adjacent one-another;

master controller means for controlling the operation of said disk drives to store digital data in said drives and to route data and instructions between a host computer and said disk drives;

means for storing data in a group of more than one-half of said drives, and means for storing parity check data relating to the data stored in said group of drives in at least one of said drives not included in said group drives;

means for regenerating erroneous or missing data from any one of of said group of drives from the parity check drive data, and data from the other drives in said group;

said controlling means including means for storing data on said drives in terms of successive bytes or groups of bits from the host computer being successively applied to successive ones of said group of drives;

means for synchronising the angular rotation of all of said drives from a signal supplied by said master controller means; and drive formatter means for coupling said master controller means to each of said drives.

32. A storage system as defined in claim 31 wherein said storage system includes a housing, and wherein each disk drive and associated formatter unit is mounted on means for guiding the drive and formatter into said housing, and mating connector means are provided on said housing and on each said drive and associated formatter, to automatically connect and disconnect each said drive and formatter into the system as they are guided into and removed from said housing, respectively.

* * * * *